(12) United States Patent
Yamada et al.

(10) Patent No.: US 12,090,774 B2
(45) Date of Patent: Sep. 17, 2024

(54) PRINTING APPARATUS AND PRINT CONTROL METHOD

(71) Applicant: CANON KABUSHIKI KAISHA, Tokyo (JP)

(72) Inventors: Akitoshi Yamada, Kanagawa (JP); Yumi Yanai, Kanagawa (JP); Keita Tamiya, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 275 days.

(21) Appl. No.: 17/849,851

(22) Filed: Jun. 27, 2022

(65) Prior Publication Data

US 2022/0324247 A1 Oct. 13, 2022

Related U.S. Application Data

(63) Continuation of application No. PCT/JP2020/044413, filed on Nov. 30, 2020.

(30) Foreign Application Priority Data

Jan. 8, 2020 (JP) ................................. 2020-001609

(51) Int. Cl.
*B41J 2/335* (2006.01)
*B41M 5/34* (2006.01)

(52) U.S. Cl.
CPC ............ *B41M 5/34* (2013.01); *B41J 2/33515* (2013.01); *B41J 2/3355* (2013.01); *B41M 2205/38* (2013.01); *B41M 2205/42* (2013.01)

(58) Field of Classification Search
CPC ...... B41J 2/33515; B41J 2/3355; B41J 2/355; B41J 11/66; B41J 2/32; B41J 2/04563;
(Continued)

(56) References Cited

U.S. PATENT DOCUMENTS

| 10,027,848 | B2 | 7/2018 | Fuse et al. |
| 10,043,118 | B2 | 8/2018 | Sumi et al. |

(Continued)

FOREIGN PATENT DOCUMENTS

| JP | H02-076700 | A | | 3/1990 | |
| JP | 2007144892 | | * | 6/2007 | ............... B41J 3/20 |
| JP | 2007-296718 | A | | 11/2007 | |
| JP | 2007-296722 | A | | 11/2007 | |
| JP | 2008-179003 | A | | 8/2008 | |
| JP | 4677431 | B | | 4/2011 | |
| JP | 2012-224074 | A | | 11/2012 | |
| JP | 2013-506582 | A | | 2/2013 | |
| JP | 2021041710 | | * | 3/2021 | ............... B41J 2/36 |
| WO | 2011/044049 | A | | 4/2011 | |

OTHER PUBLICATIONS

International Search Report issued by the Japan Patent Office on Jan. 19, 2021 in corresponding International Application No. PCT/JP2020/044413, with English translation.

*Primary Examiner* — Kristal Feggins
(74) *Attorney, Agent, or Firm* — Carter, DeLuca & Farrell LLP

(57) ABSTRACT

An apparatus is configured to heat a print medium in which a plurality of color development layers that develop colors in accordance with heating are stacked in correspondence with a plurality of colors so as to form an image on the medium by causing a desired color development layer in the plurality of color development layers to independently develop the color. The apparatus includes a printhead, an input unit configured to receive a print job, a generation unit configured to generate image data and cut information for specifying a cut position, a second generation unit configured to generate first and second pulses for driving the print head, and a drive unit configured to drive the print head to form an image on the medium and apply heat beyond a melting point to melt the medium so as to cut the medium.

12 Claims, 15 Drawing Sheets

(58) Field of Classification Search
CPC .................. B41J 2/04573; B41J 2/04575; B41J 2/04576; B41J 2/04581; B41J 2/04578; B41J 2/095; B41J 2/072; B41J 2/07; B41J 2/04596; B41J 2/04551; B41J 2/04588; B41J 2/315; B41J 2/325; B41J 3/4075; B41J 11/703; B41M 5/34; B41M 2205/38; B41M 2205/42; A45D 29/00; H04N 1/00; B41F 16/00; B41F 16/0006; G09F 3/10; G09F 2003/0201; G09F 2003/0229; G09F 2003/0241; G09F 2003/0248; C09J 7/20; C09J 7/29; C09J 2203/334; C09J 2301/204

See application file for complete search history.

(56) References Cited

U.S. PATENT DOCUMENTS

| | | |
|---|---|---|
| 10,356,282 B2 | 7/2019 | Ochiai et al. |
| 11,321,596 B2 | 5/2022 | Takesue et al. |
| 2019/0224994 A1 | 7/2019 | Roses Conesa |
| 2020/0016904 A1* | 1/2020 | Fujita .................. B41J 2/355 |
| 2020/0016905 A1* | 1/2020 | Tsuchiya ............... B41J 2/3558 |
| 2022/0222498 A1 | 7/2022 | Takesue et al. |

* cited by examiner

F I G. 16

| | -C | -CM | -CMY | -CM | -C | |
|---|---|---|---|---|---|---|
| | -C | -CM | -CMY | -CM | -C | |
| | -C | -CM | -CMY | -CM | -C | |
| | -C | -CM | -CMY | -CM | -C | |
| | -C | -CM | -CMY | -CM | -C | |
| | -C | -CM | -CMY | -CM | -C | |
| | -C | -CM | -CMY | -CM | -C | |

160

PRINTING APPARATUS AND PRINT CONTROL METHOD

CROSS-REFERENCE TO RELATED APPLICATIONS

This application is a Continuation of International Patent Application No. PCT/JP2020/044413, filed Nov. 30, 2020, which claims the benefit of Japanese Patent Application No. 2020-001609, filed Jan. 8, 2020, both of which are hereby incorporated by reference herein in their entirety.

BACKGROUND OF THE INVENTION

Field of the Invention

The present invention relates to a printing apparatus and a print control method and, more particularly, to, for example, a printing apparatus that performs image printing by heating, by a heating element, a print medium formed by stacking color development layers of different colors, and a print control method.

Description of the Related Art

In printing using a thermal printhead, conventionally, monochrome printing using thermal paper, color printing using an ink ribbon, and the like have widely been used. On the other hand, in recent years, color printing using a paper sheet including color development layers of a plurality of colors has been proposed and proliferated as a print means for simple photos. The color development layers of the plurality of colors need different heating temperatures and heating times to develop the colors. Using the difference, specific color development layers are caused to develop the colors, thereby printing a color image (see Japanese Patent Laid-Open No. 2013-506582 and Japanese Patent No. 4677431).

In addition, Japanese Patent Laid-Open No. 2012-224074 proposes a configuration that uses roll paper as print paper and cuts it into an arbitrary length.

In the above-described conventional example, however, to cut a print medium at a correct position desired by a user, a position detection mechanism and a cut mechanism need to be provided, and this increases the cost of the entire apparatus.

SUMMARY OF THE INVENTION

The present invention has been made in consideration of the above-described conventional example, and provides a technique capable of cutting a print medium at a correct position into an arbitrary shape without using a dedicated cut mechanism.

According to an aspect of the present invention, there is provided a printing apparatus configured to heat a sheet-shaped print medium in which a plurality of color development layers that develop colors in accordance with heating are stacked in correspondence with a plurality of colors so as to form an image on the print medium by causing a desired color development layer in the plurality of color development layers to independently develop the color, the apparatus comprising: a printhead including a plurality of heating elements; an input unit configured to receive, from a host apparatus, a print job including print data and information for instructing to cut the print medium of a printed image or not to cut; a first generation unit configured to, when the print job received by the input unit instructs to cut the print medium of the printed image, generate, from the print data, image data for forming an image on the print medium and cut information for specifying a position to cut the image from the print medium; a second generating unit configured to generate a first pulse for driving the plurality of heating elements of the printhead based on the image data generated by the first generation unit, and generate a second pulse for driving the plurality of heating elements of the printhead based on the cut information generated by the first generation unit; and a drive unit configured to drive the plurality of heating elements by the first pulse generated by the second generating unit to form an image on the print medium, and drive the plurality of heating elements by the second pulse generated by the second generating unit to apply heat beyond a melting point of the print medium to melt the print medium so as to cut the print medium on which the image is formed.

Further features of the present invention will become apparent from the following description of exemplary embodiments with reference to the attached drawings.

BRIEF DESCRIPTION OF THE DRAWINGS

FIG. 16 is a view showing another example of the image of the cut print service according to Example 3.

DESCRIPTION OF THE EMBODIMENTS

Figure 1:
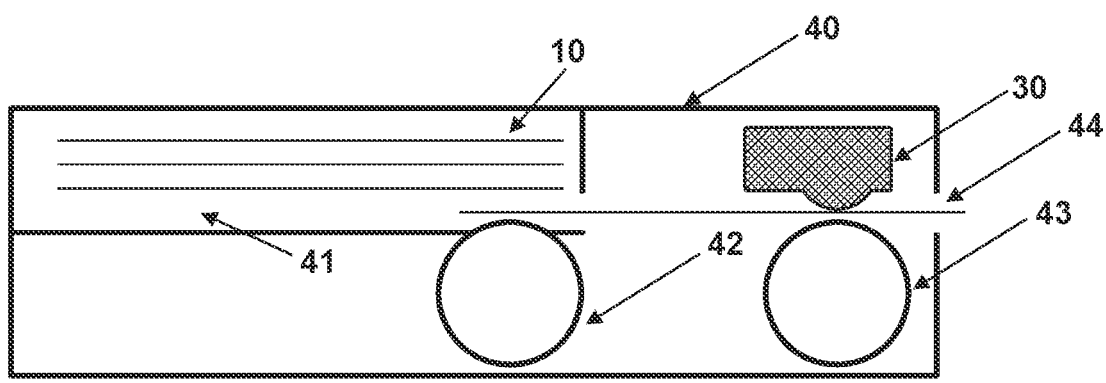
FIG. 1 is a side sectional view showing the schematic configuration of a printing apparatus according to a representative example of the present invention.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

<Outline of Printing Apparatus (FIGS. 1 to 3)>

FIG. 1 is a side sectional view showing the schematic configuration of a printing apparatus according to a representative example of the present invention.

As shown in FIG. 1, a printing apparatus 40 includes a printhead 30, a storage unit 41, a conveyance roller 42, a platen 43, and a discharge port 44. A plurality of sheet-shaped print media 10 can be stored in the storage unit 41. The print media 10 can be replenished by opening/closing a cover (not shown). At the time of printing, the print medium 10 is conveyed to the lower side of the printhead 30 by the conveyance roller 42. After an image is formed between the platen 43 and the printhead 30, the print medium 10 is discharged from the discharge port 44, thereby completing printing.

Figure 2:
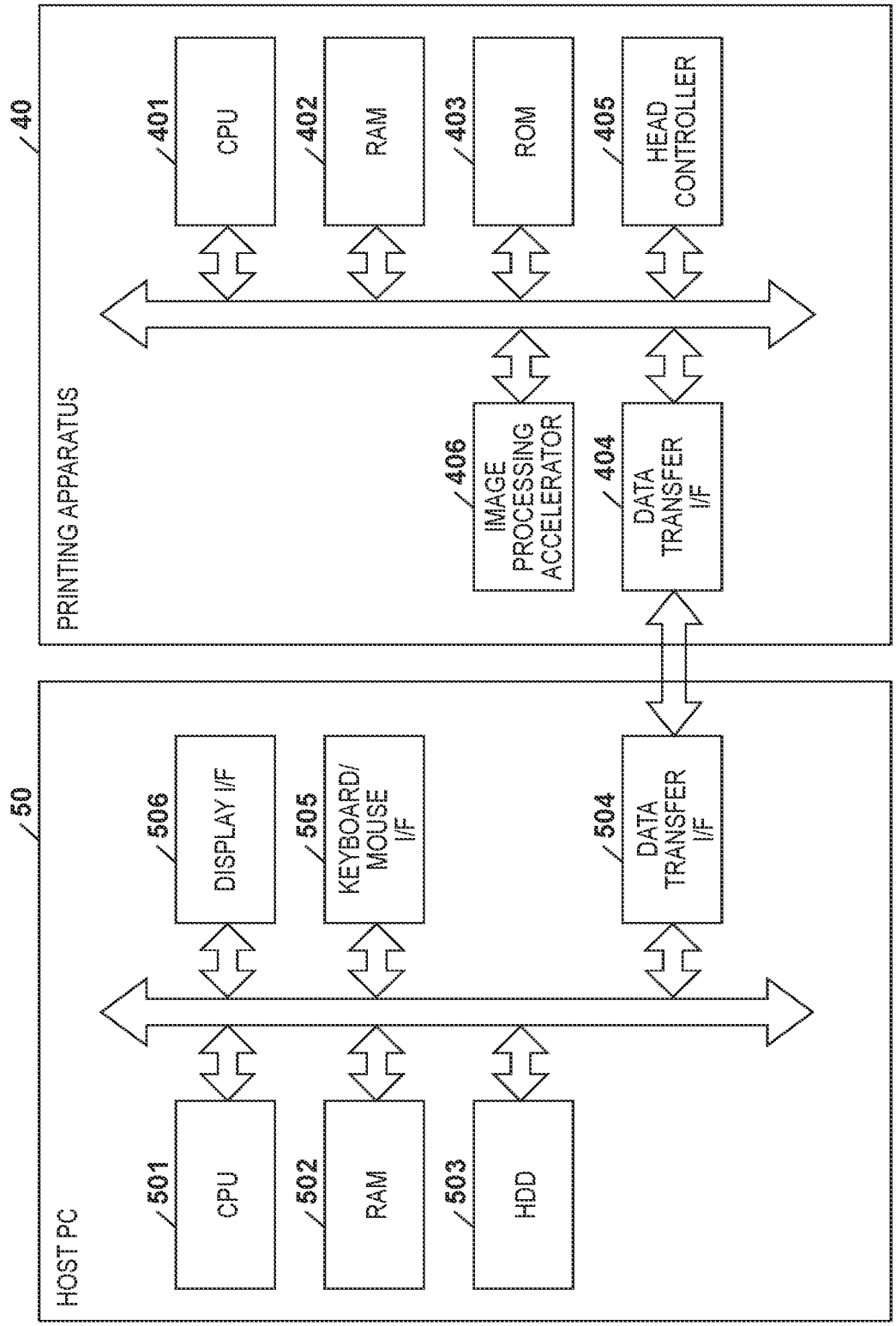
FIG. 2 is a block diagram showing the control configuration of the printing apparatus shown in FIG. 1 and a host apparatus connected to this.

FIG. 2 is a block diagram showing the control configuration of a printing system formed by the printing apparatus shown in FIG. 1 and a host apparatus connected to this. As shown in FIG. 2, the printing system is formed by the printing apparatus 40 shown in FIG. 1, and a personal computer (host PC) 50 serving as a host apparatus.

The host PC 50 includes a CPU 501, a RAM 502, an HDD 503, a data transfer interface (I/F) 504, a keyboard/mouse interface (I/F) 505, and a display interface (I/F) 506.

The CPU 501 executes processing according to a program held in the HDD 503 or the RAM 502. The RAM 502 is a volatile storage and temporarily holds programs and data. The HDD 503 is a nonvolatile storage and similarly holds programs and data. The data transfer I/F 504 controls data transmission/reception to/from the printing apparatus 40. As the data transmission/reception transfer method, wired connection such as USB, IEEE1394, or LAN or wireless connection such as Bluetooth® or WiFi can be used. The Keyboard/Mouse® I/F 505 is an interface configured to control a UI (User Interface) such as a keyboard or a mouse, and a user can input information to the host PC via this. The display I/F 506 controls display on a display (not shown).

On the other hand, the printing apparatus 40 includes a CPU 401, a RAM 402, a ROM 403, a data transfer interface (I/F) 404, a head controller 405, and an image processing accelerator 406.

The CPU 401 executes processing according to each embodiment to be described later in accordance with a program held in the ROM 403 or the RAM 402. The RAM 402 is a volatile storage and temporarily holds programs and data. The ROM 403 is a nonvolatile storage and holds table data and programs used in processing according to each embodiment to be described later. The data transfer I/F 404 controls data transmission/reception to/from the PC 50.

The head controller 405 controls a heating operation (to be described later) of the printhead 30 based on print data. More specifically, the head controller 405 is configured to load control parameters and print data from a predetermined address of the RAM 402. That is, when the CPU 401 writes the control parameters and print data to the predetermined address of the RAM 402, processing is activated by the head controller 405, and the heating operation of the printhead is performed.

The image processing accelerator 406 is formed by hardware and executes image processing faster than the CPU 401. More specifically, the image processing accelerator 406 is configured to load parameters and data necessary for image processing from a predetermined address of the RAM 402. When the CPU 401 writes the parameters and data to the predetermined address of the RAM 402, the image processing accelerator 406 is activated, and predetermined image processing is performed.

Note that the image processing accelerator 406 is not always a necessary constituent element, and the above-described table parameter creation processing and image processing may be executed only by the processing of the CPU 401 in accordance with the specifications of the printing apparatus.

<Outline of Configuration of Printhead (FIG. 3)>

Figure 3:
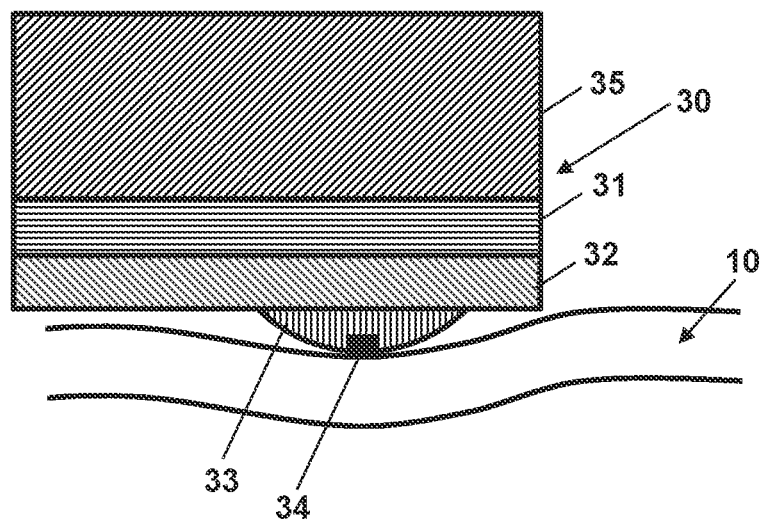
FIG. 3 is a side sectional view showing the detailed configuration of a printhead mounted in the printing apparatus shown in FIG. 1.

FIG. 3 is a side sectional view showing the configuration of the printhead and the state of the contact region between the printhead and a print medium.

The printhead 30 includes a glaze 32 on a substrate 31. The glaze 32 may further include a "convex glaze" 33. If the convex glaze 33 exists, a resistor 34 is arranged on the surface of the convex glaze 33. If the convex glaze 33 does not exist, the resistor 34 is arranged on the surface of the flat glaze 32. Note that a protective film layer is preferably formed on the resistor 34, the glaze 32, and the convex glaze 33. In general, the combination of the glaze 32 and the convex glaze 33, which are made of the same material, will be referred to as "the glaze of the printhead" hereinafter.

The substrate 31 is in contact with a heat sink 35 and is cooled using a fan or the like. The print medium 10 contacts the glaze of the printhead whose length is substantially more than the length of an actual heating resistor in general. The resistor 34 is an electrothermal transducer (a heater or a heating element) that generates heat upon receiving a current. A typical resistor has a length of about 120 μm in the conveyance direction of the print medium 10. However, the thermal contact region between the print medium and the glaze of a general printhead has a length of 200 μM or more.

<Outline of Print Principle (FIGS. 4 and 5)>

Figure 4:
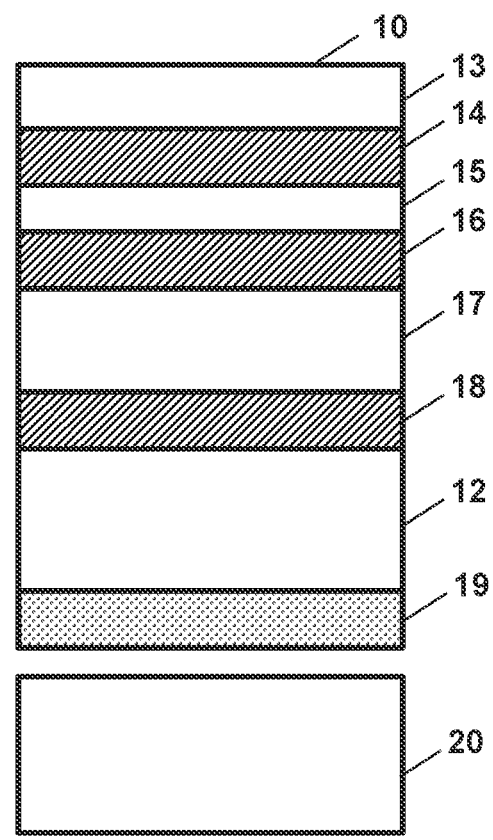
FIG. 4 is a side sectional view showing the detailed structure of an ink ribbon heated by the printhead shown in FIG. 3.

FIG. 4 is a sectional view showing the structure of a sheet-shaped print medium to be used for image processing using infrared rays as a heat source. In the print medium 10, as will be described below in detail, color development layers of a plurality of colors, which develop the colors when heated by heat rays (infrared rays) radiated from the resistor 34 upon receiving a supplied current, are stacked. Since a full color image is formed when the color development layers develop the colors, the print medium 10 is also called an infrared image member. Hence, in that sense, the print medium 10 will be referred to as an infrared image member in the following explanation.

As shown in FIG. 4, in the infrared image member 10, image forming layers 14, 16, and 18, spacer layers 15 and 17, and a protective film layer 13 are formed on a base material 12 that reflects light. The image forming layers 14, 16, and 18 are generally yellow (Y), magenta (M), and cyan (C), respectively, in full color printing. However, a combination of other colors may be used.

The image forming layers are colorless in the initial state. When heated to a specific temperature called an activation temperature, each layer changes to a colored state. The order of the colors of the image forming layers can arbitrarily be selected. One suitable color order has been described above. As another suitable order, the three image forming layers 14, 16, and 18 are cyan (C), magenta (M), and yellow (Y), respectively. An example in which the layers are configured in the above-described order of yellow (Y), magenta (M), and cyan (C) will be described here.

The spacer layer 15 is preferably thinner than the spacer layer 17. However, this does not apply to a case in which materials including both layers substantially have the same thermal diffusivity. The function of the spacer layer is to control thermal diffusion in the infrared image member 10. Suitably, if the spacer layer 17 is formed by the same member as the spacer layer 15, the spacer layer 17 is preferably thicker at least four times. All layers arranged on the base material 12 are substantially transparent before image formation. If the base material 12 has a reflecting color (for example, white), a color image formed in the infrared image member 10 is visually recognized through the protective film layer 13 against the reflecting background provided by the base material 12. Since the layers arranged on the base material 12 are transparent, the combination of colors formed in the image forming layers can be seen.

Note that the three image forming layers 14, 16, and 18 of the infrared image member 10 are arranged on the same side of the base material 12. However, some image forming layers may be arranged on the opposite side of the base material 12. Also, FIG. 4 shows an example in which the infrared image member 10 is seal paper, and an adhesive layer 19 and a peeling layer 20 exist on the back side of the base material 12. Hence, the infrared image member 10 can be pasted to another substance surface by peeling the peeling layer 20.

The image forming layers 14, 16, and 18 are at least partially independently processed by changing two adjustable parameters, that is, the temperature and time. These parameters are adjustable, and an image is formed in a desired image forming layer by selecting the printhead temperature and the time period during heating of the infrared image member.

Here, each of the image forming layers 14, 16, and 18 is processed when heated while the printhead 30 contacts the uppermost layer of the member, that is, the protective film layer 13 of the infrared image member 10. An activation temperature (Ta3) of the image forming layer 14 (the third layer counted from the base material 12, or the image forming layer closest to the surface of the infrared image member 10) is higher than an activation temperature (Ta2) of the image forming layer 16, and is similarly higher than an activation temperature (Ta1) of the image forming layer 18.

Heating of image forming layers at farther distances from the printhead 30 is delayed by time necessary for heating to diffuse heat to those layers via the spacer layers. Because of this heating delay, for the image forming layers of lower activation temperatures (the layers farther from the printhead), the image forming layer closer to the printhead never activates the image forming layers on the lower side even its activation temperature is substantially higher. The image forming layer can be heated to a temperature higher than those activation temperatures. Hence, when processing the image forming layer 14 of the uppermost layer, the printhead 30 is heated to a relatively high temperature in a short time. This heating is insufficient for both the image forming layers 16 and 18, and these layers are not activated.

To activate only an image forming layer closer to the base material 12 (in this case, the image forming layer 16 or 18), the image forming layer is heated for a sufficiently long time at a temperature lower than the activation temperature of the image forming layer farther from the base material 12. If the image forming layer of the lower activation temperature is this activated, the image forming layer of the higher activation temperature is not activated.

Heating of the infrared image member 10 is preferably performed using the printhead 30. However, some method of giving controlled heat to the infrared image member may be used. For example, some known means such as using a modulated light source (for example, a laser light source) may be used.

Figure 5:
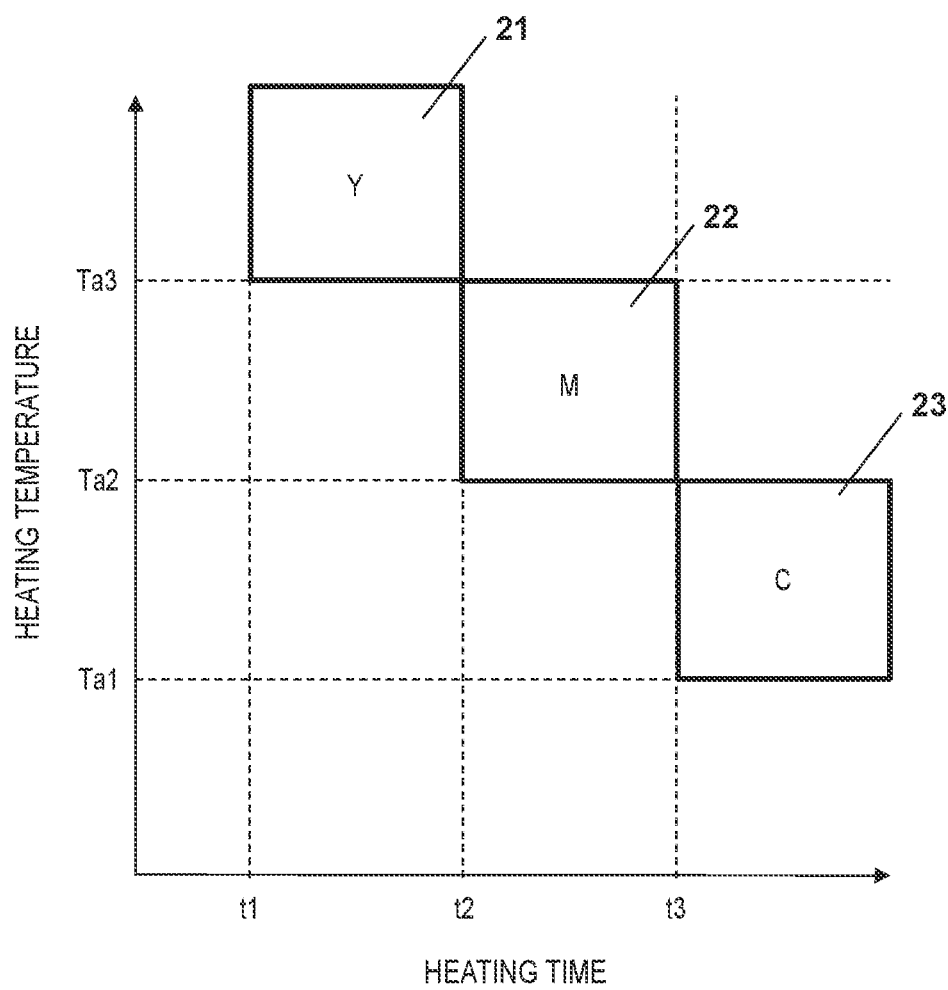
FIG. 5 is a view for explaining a print principle by the printhead shown in FIG. 3.

FIG. 5 is a view for explaining the printhead heating temperature and time necessary for processing the three image forming layers shown in FIG. 4.

Referring to FIG. 5, the ordinate represents the heating temperature on the surface of the infrared image member 10 that contacts the printhead 30, and the abscissa represents the heating time. A region 21 (the printhead is heated to a relatively high temperature for a relatively short heating time) provides image formation of the image forming layer 14, and a region 22 (the printhead is heated to an intermediate temperature for an intermediate heating time) provides image formation of the image forming layer 16. Also, a region 23 (the printhead is heated to a relatively low temperature for a relatively long heating time) provides image formation of the image forming layer 18. The time necessary for image formation of the image forming layer 18 is substantially longer than the time necessary for image formation of the image forming layer 14.

The activation temperature selected for an image forming layer generally falls within the range of about 90° C. to about 300° C. The activation temperature (Ta1) of the image forming layer 18 is preferably low as consistently as possible, during shipment and storage, for the thermal stability of the infrared image member, and is suitably, for example, about 100° C. or more. The activation temperature (Ta3) of the image forming layer 14 is preferably consistently low such that the image forming layer 14 is not activated by the heating method of this embodiment, and the image forming layers 16 and 18 are activated by heating through this layer, and is suitably, for example, about 200° C. or more. The activation temperature (Ta2) of the image forming layer 16 suitably ranges from about 140° C. to about 180° C. and satisfies Ta1<Ta2<Ta3.

The printhead 30 used here includes a resistor array in which a plurality of resistors are linearly arranged to extend substantially throughout the whole width of an image (a direction orthogonal to the conveyance direction of the infrared image member).

Note that the print width of the printhead may be shorter than the width of an image. In this case, the printhead is configured to move with respect to the infrared image member 10 to process the whole width of the image, or is used together with another printhead.

When a current is supplied to the resistors, heating pulses are provided. On the other hand, image formation is performed when the infrared image member is being conveyed in the direction orthogonal to the array direction of the resistors of the printhead. The time of heating the infrared image member 10 by the printhead 30 typically falls within the range of about 0.001 to about 100 msec for each line of the image. The upper limit is reasonably set in consideration of an image print time, and the lower limit is defined by the restrictions of an electronic circuit. The dot interval of a formed image generally falls within the range of 100 to 600 lines per inch in both the vertical direction and the conveyance direction of the infrared image member 10. The interval may be different in each direction.

The above-described printing apparatus is a kind of thermal printer. The printing method employed by the apparatus is a ZINK (Zero Ink) method, which is also called a Zero Ink Technology®.

Example 1

Here, to emphasize the effect of Example 1, a conventional printing method will be described first as a comparative example, and the example will be described after that.

Figure 6:
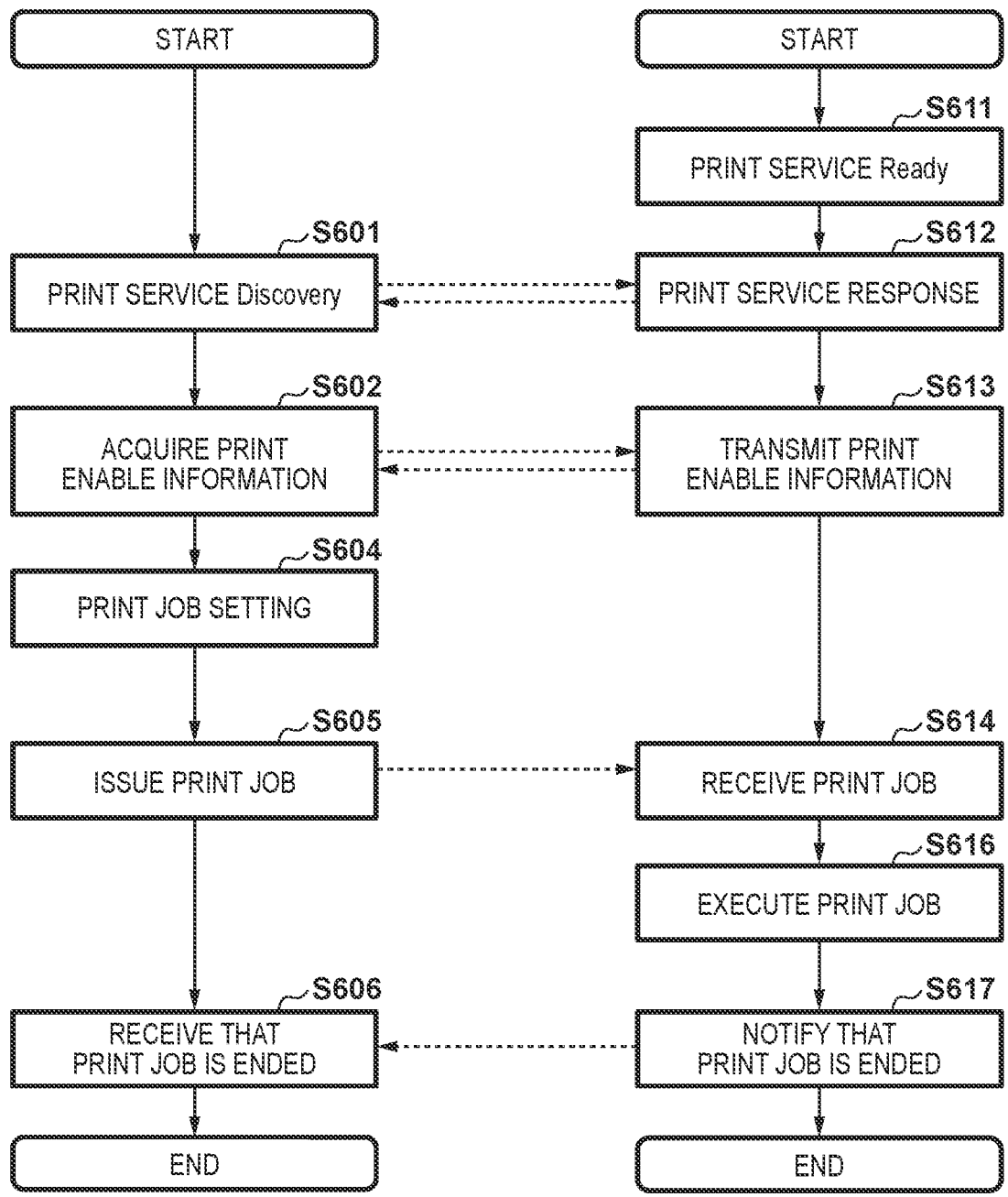
FIG. 6 is a view for explaining control of a printhead of a conventional example as a comparative example.
Figure 7:
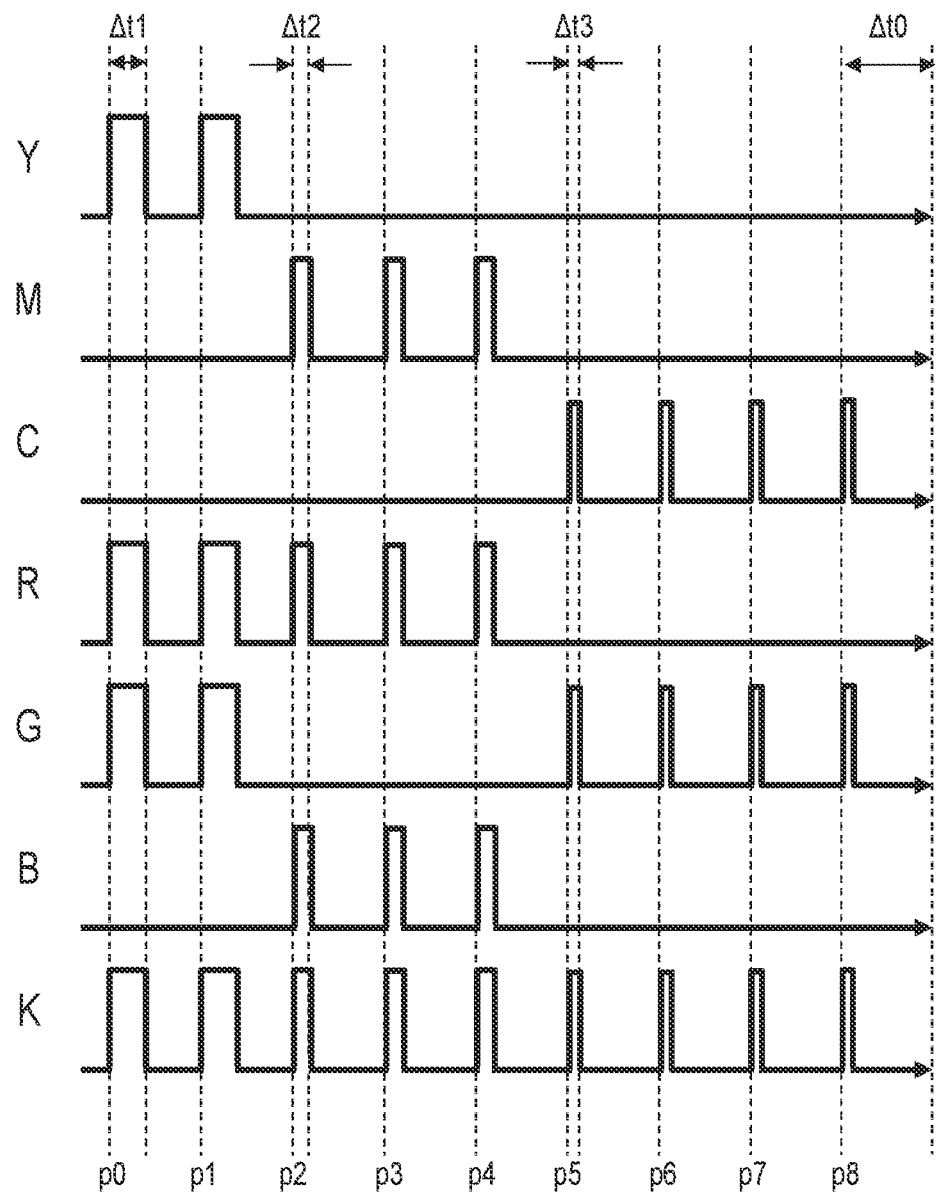
FIG. 7 is a timing chart showing conventional print processing as a comparative example.

Description of Comparative Example (FIGS. 6 and 7)

FIG. 6 is a flowchart showing the processing of the printing apparatus 40 and the host PC 50 when a conventional print service is executed in the above-described printing system. Referring to FIG. 6, steps S601, S602, and S604 to S606 represent the processing of the host PC 50, and steps S611 to S614, S616, and S617 represent the processing of the printing apparatus 40. Also, as shown in FIG. 6, if the user demands printing, the processing of the host PC 50 starts, and accordingly, the processing of the printing apparatus 40 starts. Hence, the printing apparatus 40 confirms, in step S611, that it can perform printing, starts the print service, and is set in a print preparation completion state (Ready).

In this state, when the host PC 50 executes print service Discovery in step S601, in step S612, the printing apparatus 40 responds to the Discovery, and notifies the host PC that the printing apparatus is an apparatus capable of providing the print service. Next, in step S602, the host PC 50 acquires print enable information. Basically, the host PC 50 requests print enable information from the printing apparatus 40. In step S613, in response to the request, the printing apparatus 40 notifies the host PC of the information of the print service that the apparatus can provide.

Furthermore, in step S604, the host PC 50 constructs a user interface for print job creation based on the notified print enable information. More specifically, based on the print enable information of the printing apparatus 40, appropriate choices such as print sizes and printable paper sizes are displayed on the display and provided to the user. Next, in step S605, the host PC 50 issues a print job.

In response to this, the printing apparatus 40 receives the print job in step S614, and executes the print job in step S616. When printing based on the print job in the printing apparatus 40 is completed, in step S617, the printing apparatus 40 notifies the host PC 50 of the printing completion. In step S606, the host PC 50 receives the printing completion notification and notifies the user of it.

When the print job is completed, each of the host PC 50 and the printing apparatus 40 completes the series of print service processes.

In the above description, various kinds of information transmission have been described using an example in which the host PC 50 sends a request to the printing apparatus 40, and the printing apparatus 40 responds to the request. However, communication between the host PC and the printing apparatus is not limited to a so-called push type, and a so-called push type in which the printing apparatus 40 spontaneously transmits information to the host PC 50 (and other host PCs) existing in the network may be used.

FIG. 7 is a view showing an example of heating pulses applied to the printhead of the printing apparatus.

Colors to be developed are shown on the left side of FIG. 7, and corresponding heating pulses are shown on the right side. For example, when developing yellow (Y), to implement the heating temperature and the heating time in the region 21 shown in FIG. 5, heating in time $\Delta t1$ is executed twice in total at an interval $\Delta t0$. Also, when developing magenta (M), to implement the heating temperature and the heating time in the region 22 shown in FIG. 5, heating in time $\Delta t2$ is executed three times in total at the interval $\Delta t0$. Similarly, when developing cyan (C), to implement the heating temperature and the heating time in the region 23 shown in FIG. 5, heating in time $\Delta t3$ is executed four times in total at the interval $\Delta t0$.

Note that in FIG. 7, to facilitate understanding, it is assumed that a relationship given by $\Delta t1 \times 2 = \Delta t2 \times 3 = \Delta t3 \times 4$ holds. The total time of heating pulses applied to the printhead 30 is constant independently of the color to be developed.

However, the heating times hold $t2 > \Delta t1 + \Delta t0 > t1$, $t3 > \Delta t2 + \Delta t0 \times 2 > t2$, and $\Delta t3 + \Delta t0 \times 3 > t3$, and the relative relationship between the heating times of the image forming layers is given by heating time of $Y$ < heating time of $M$ < heating time of $C$ where Y, M, and C indicate the image forming layers 14, 16, and 18, respectively.

Here, as for the heat amount applied by the printhead 30, during the pulse interval $\Delta t0$, heat is conducted to the glaze 32, the substrate 31, and the heat sink 35 of the printhead 30, and therefore, the temperature of the infrared image member 10 lowers. Similarly, since the amount of heat conducted to the infrared image member 10 is also conducted to the platen 43 and the like, the temperature of the infrared image member 10 lowers accordingly. As a result, since the supplied energy is the same, the relative relationship between the peak temperatures of the image forming layers in heating is given by peak temperature of $Y$ > peak temperature of $M$ > peak temperature of $C$ Here, when control is performed such that peak temperature of $Y > Ta3$, $Ta3 >$ peak temperature of $M > Ta2$, and $Ta2 >$ peak temperature of $C > Ta1$ hold, the colors of Y, M, and C can independently be developed.

Heating pulses for controlling color development of R, G, and B, which are secondary colors, and K which is a tertiary color will be described next.

For red (R) shown in FIG. 7, the heating pulses are controlled such that the colors are developed in the order of yellow (Y)→magenta (M). Also, for green (G) shown in FIG. 7, the heating pulses are controlled such that the colors are developed in the order of yellow (Y)→cyan (C). Similarly, for blue (B) shown in FIG. 7, the heating pulses are controlled such that the colors are developed in the order of magenta (M)→cyan (C). Finally, for black (K) shown in FIG. 7, the heating pulses are controlled such that the colors are developed in the order of yellow (Y)→magenta (M)→cyan (C).

However, in the above-described comparative example, the configuration does not handle so-called cut printing for cutting the infrared image member 10 that is a print medium and printing. Also, conventionally, it is necessary to separately prepare a cut position detection mechanism and a cut mechanism for the print medium to implement cut.

Hence, in Example 1, the following print control processing is executed for the above-described comparative example.

Description of Example (FIGS. 8 to 12)

Figure 8:
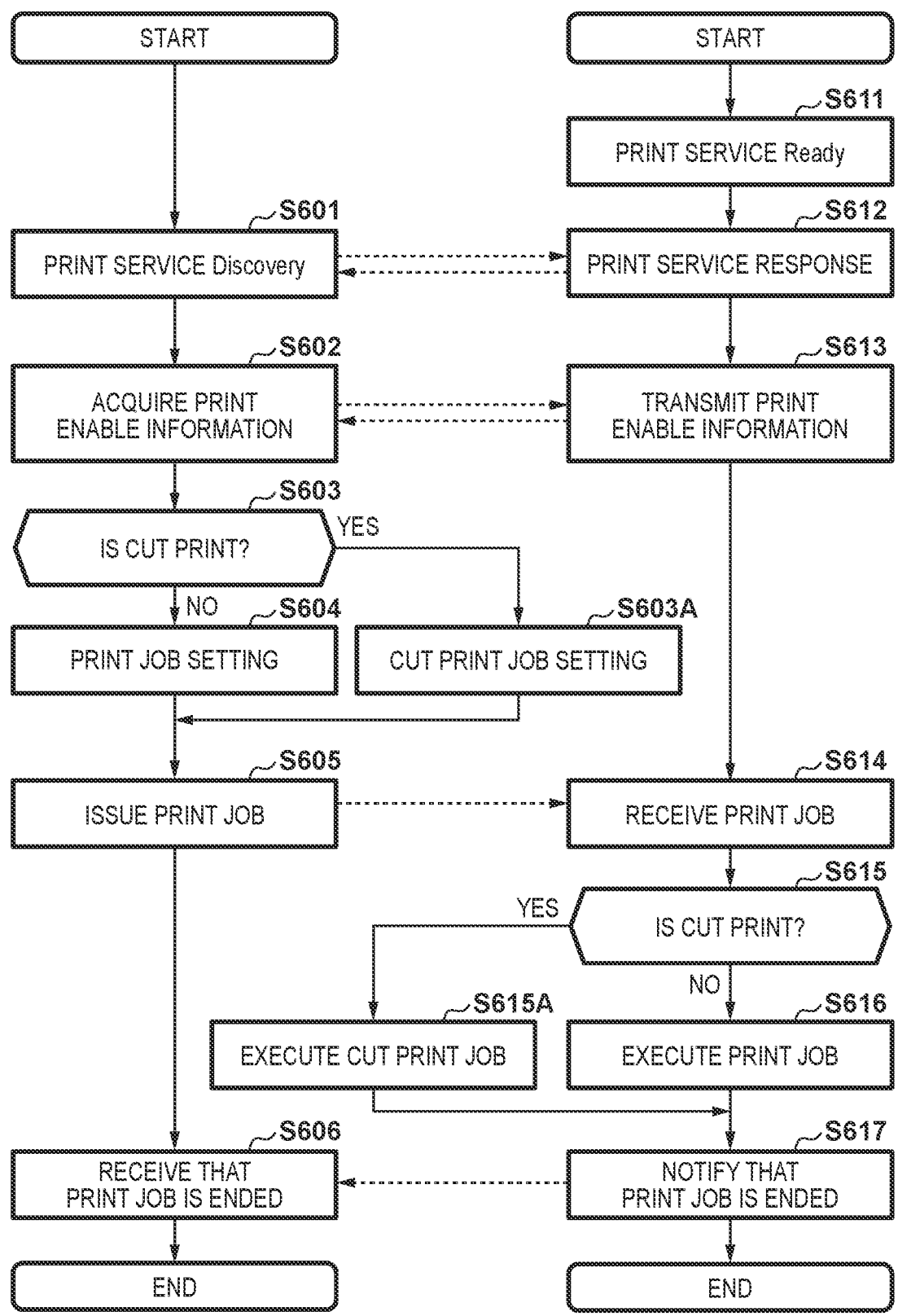
FIG. 8 is a flowchart showing processing of a printing apparatus and a host PC when a print service according to Example 1 is executed in a printing system.

FIG. 8 is a flowchart showing processing of the printing apparatus 40 and the host PC 50 when a print service according to Example 1 is executed in the above-described printing system. Note that in FIG. 8, for the same processing steps as already described with reference to FIG. 6, the same step numbers are added, and a description thereof will be omitted.

In step S611 in FIG. 8, the printing apparatus 40 confirms that it can perform printing and cope with cut printing, and starts the print service. Also, in response to the print service Discovery of the host PC 50 in step S601, in step S612, the printing apparatus 40 notifies the host PC that the printing apparatus is an apparatus capable of providing a print service including a cut print service. Hence, in step S613 as well, the printing apparatus 40 notifies the host PC of print enable information including the information of the cut print service.

In response to this, the host PC 50 displays, on the display or the like, information for selecting which one of the normal print service and the cut print service is to be used, more specifically, display and choices of print service and cut print service and notifies the user of this. That is, in step S603, the process checks whether an instruction from the user is "print service" or "cut print service".

Here, if the selection result by the user is "print service", the process advances to step S605 to execute the same processing as described with reference to FIG. 6. If the selection result is "cut print service", the process advances to step S603A. In step S603A, the host PC 50 constructs a user interface for cut print job creation based on the print enable information. More specifically, based on the print enable information from the printing apparatus 40, a cut print job is created using cut pixel information in addition to a print size and a printable paper size. Details of cut print job creation will be described later with reference to FIGS. 10 and 11. After creation of the cut print job, the process advances to step S605.

On the other hand, in step S615, the printing apparatus 40 checks whether the received print job is a normal print job or a cut print job. Here, if the received print job is a cut print job, the process advances to step S615A to execute the cut print job in a cut print mode, and then advances to step S617. On the other hand, if the received print job is a normal print job, the same processing as described with reference to FIG. 6 is executed.

Figure 9:
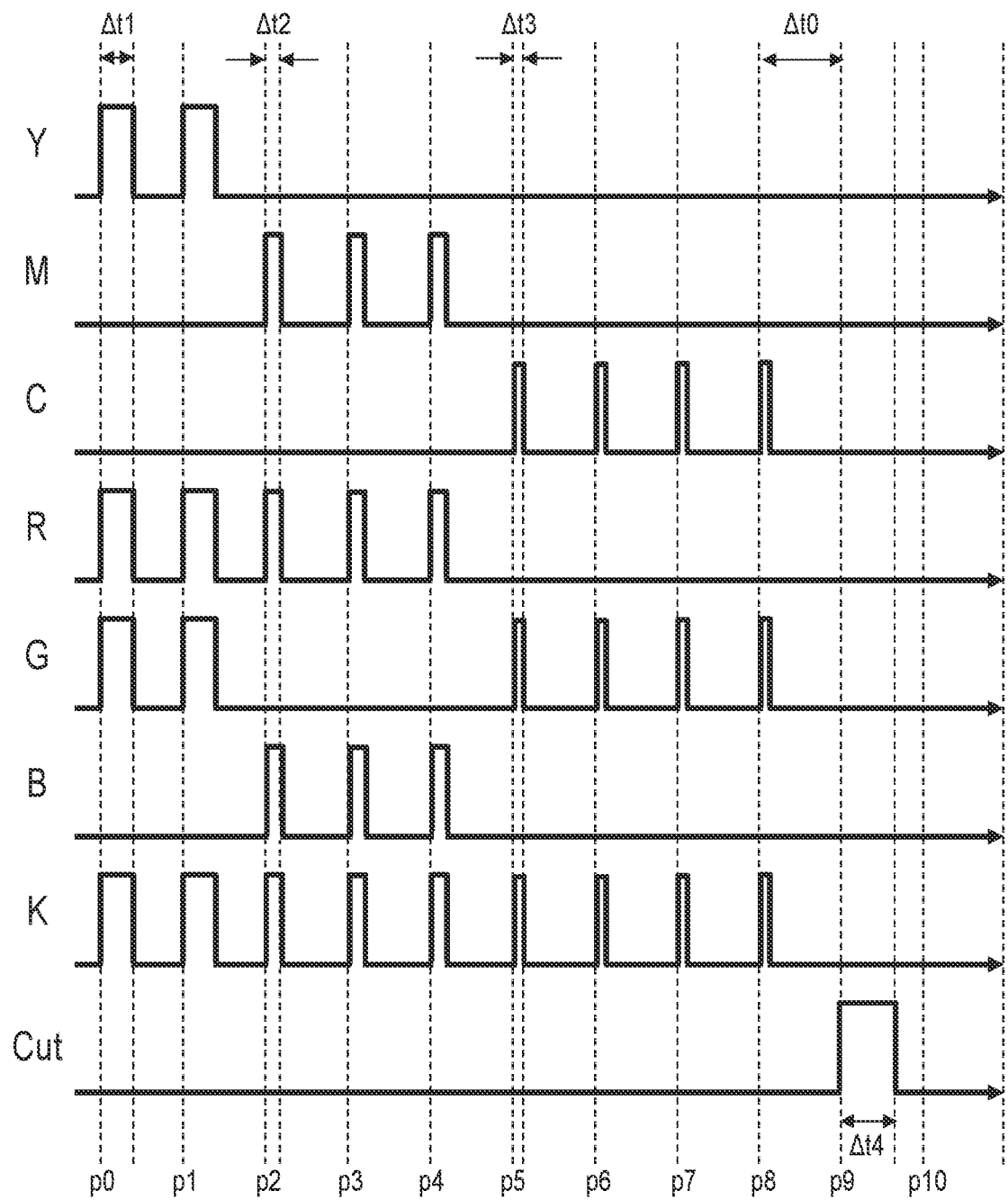
FIG. 9 is a view showing an example of heating pulses applied to the printhead of the printing apparatus according to the processing of Example 1.

FIG. 9 is a view showing an example of heating pulses applied to the printhead of the printing apparatus according to the processing of Example 1. Note that in FIG. 9, a description of the same components and symbols as described with reference to FIG. 7 will be omitted, and only components unique to Example 1 will be described here.

As shown in FIG. 9, a heating pulse for cut is a pulse "Cut" on the lowermost row, and the heating time is $\Delta t4$. Here, the cut heating time $\Delta t4$ satisfies $\Delta t4 <$ heating time $\Delta t1$ of $Y + \Delta t0$, and $\Delta t4 = \Delta t1 \times 2 = \Delta t2 \times 3 = \Delta t3 \times 4$, and the relative relationship between the heating times is given by heating time of Cut<heating time of $Y$<heating time of $M$<heating time of $C$ Here, as for the heat amount applied by the printhead 30, during the interval time $\Delta t0$, heat is conducted to the glaze 32, the substrate 31, and the heat sink 35 of the printhead 30, and therefore, the temperature of the infrared image member 10 lowers. Similarly, since the amount of heat conducted to the infrared image member 10 is also conducted to the platen 43 and the like, the temperature of the infrared image member 10 lowers accordingly. As a result, since the supplied energy is the same, peak temperatures in heating holds peak temperature of Cut>peak temperature of $Y$>peak temperature of $M$>peak temperature of $C$.

Here, in particular, when control is performed such that peak temperature of Cut>melting point of infrared image member 10>peak temperature of $Y$ holds, the infrared image member 10 can be cut without causing any of the Y, M, and C color development layers to develop the color.

Table 1 is a table showing representative thermoplastic materials (thermoplastic resins) usable as the infrared image member 10 and melting points thereof.

TABLE 1

| Material name | Melting point |
| --- | --- |
| polyethylene | 130° C. to 137° C. |
| polypropylene | 160° C. to 175° C. |
| polyacetal | 172° C. to 184° C. |
| polybutylene terephthalate | 227° C. |
| polyamide nylon 66 | 260° C. |

In addition, the printing apparatus 40 does not continuously apply pulses at the time of color development, and heating is performed for a very short time. For this reason, even under a condition that peak temperature of $Y$>melting point of infrared image member 10 a material can suitably be selected from those described above.

For example, even if polyethylene with the lowest melting point in Table 1 is used, the infrared image member 10 can be molten and cut only at the time of cut heating pulse application by controlling the heating pulse times necessary for color development of Y, M, and C within such ranges that do not cause cut. That is, it is possible to prevent unnecessary cut from occurring in color development by imparting restrictions to color development at the time of cut printing.

If a material, such as polypropylene, having a higher melting point is used, the color development restrictions in cut printing can be suppressed.

Table 2 is a table showing suitable heating pulse control of the printing apparatus 40 for a medium dedicated to printing, which has a relatively high melting point, and a cut printing compatible medium having a low melting point, and color development densities of output images thereof.

TABLE 2

| Material name | Melting point | Heating pulse | Color development density |
|---|---|---|---|
| Medium dedicated to printing | high | long | high |
| Cut printing compatible medium | low | short | low |

As described above, when media of different melting points are prepared as the medium dedicated to printing and the cut printing compatible medium, the cut printing function can be implemented directly using resistors (heaters) used for an existing medium dedicated to printing. In other words, the cut printing function can be added to an apparatus already distributed on the market by updating the control program of the printing apparatus 40.

Also, as for the melting point of the peeling layer 20, peak temperature of Cut<melting point of peeling layer 20 preferably holds. This is because if a cut portion and a non-cut portion, including the peeling layer 20, are completely separated by cut, the cut portion may be drawn into the printing apparatus 40 without being discharged from the discharge port 44. Hence, in cut printing, the peeling layer 20 also plays an auxiliary role of stably discharging the infrared image member 10 from the discharge port 44.

Figure 10:
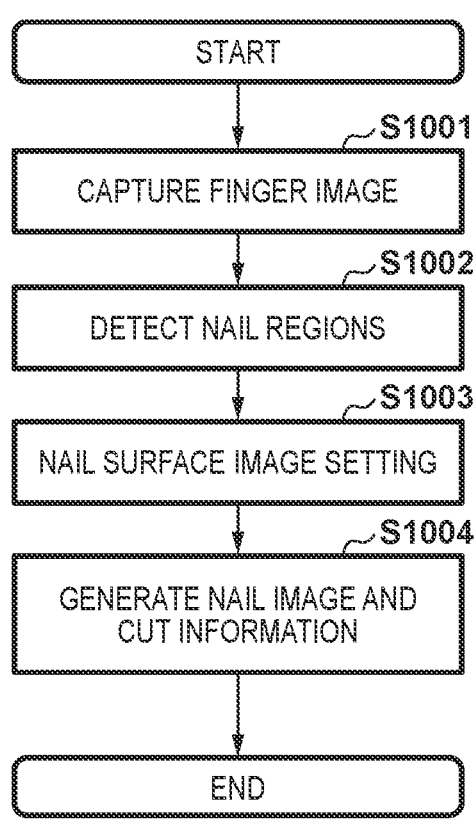
FIG. 10 is a flowchart showing job creation processing of a cut print service according to Example 1.

FIG. 10 is a flowchart showing job creation processing of a cut print service according to Example 1. This is a flowchart for explaining detailed processing of cut print job setting in step S603A of FIG. 8. As an example of the cut print service, an example of "nail seal printing" will be described here. Note that a case in which human fingers are captured, nail regions are detected from the finger image, and a nail image is cut will be described here as an example for the description of the example. However, the present invention is not limited to this. For example, the image capturing target is not limited to human fingers and may be any object desired by the user, such as an animal, a landscape, or a human portrait. The target to be cut from the captured image can also be a desired specific part selected by the user from the animal, the landscape, or the portrait.

According to FIG. 10, when processing is started, in step S1001, a finger image including nails is captured by an image capturing device (not shown) such as a digital camera or a smartphone. In step S1002, nail regions in the captured image are detected. Here, nail regions in the image are specified, and additionally, actual nail sizes are estimated, thereby acquiring nail regions in actual sizes.

As a method of estimating an actual nail size, the following methods can be considered. That is, A method of acquiring an image capturing distance using a distance measurement sensor or the like and estimating the actual size based on the image capturing distance and a size in the captured image.

A method of capturing a nail together with a substance (a ruler or the like) in a known size and estimating the actual size based on the substance size and the relative size of the nail.

A method of causing the user to actually measure the actual size of a nail and input the actual size on a user interface.

Also, when setting the actual size of a nail, a more correct actual size of the nail can be set by taking the curve at the nail tip portion into consideration.

As the method, the following methods can be considered. That is,

A method of grasping the curve shape of a nail using a distance measurement senor or the like and estimating the road distance of the nail.

A method of, when capturing a finger image, capturing the image from a direction in which the curve shape of a nail can be confirmed (for example, a position on the extension line from a fingertip direction) and acquiring the road distance of the nail.

A method of, when actually measuring the actual size of a nail, causing the user to do actual measurement using a means such as a tape measure capable of measuring a road distance and input the road distance on a user interface.

A method of displaying examples of the curve shape of a nail (a shape with a small curve, an average curve shape, a shape with a large curve, and the like), causing the user to select an example close to the actual curve shape of the nail, and estimating the road distance (short, average, long, and the like) in accordance with the selection result.

Also, when actually applying a nail seal, position accuracy when sticking the nail seal to a nail depends on the user. Hence, it is preferable to set a little large nail region. This can reduce occurrence of a state in which the nail under the seal is visible when the position to stick the seal deviates a little.

Similarly, considering shaping the cut end portion of a nail seal using a file or the like, it is also effective to set the tip side of the nail long a little. This can similarly reduce occurrence of a state in which the nail under the seal is visible after filing down.

Next, in step S1003, an image design to be printed in the nail regions is selected and set. In step S1004, a nail image+cut information are created. More specifically, when generating a nail image, the image selected in step S1003 is extracted in accordance with the actual size of the nail set in step S1002.

Next, cut information is generated by designating the nail end region set in step S1002.

Figure 11:
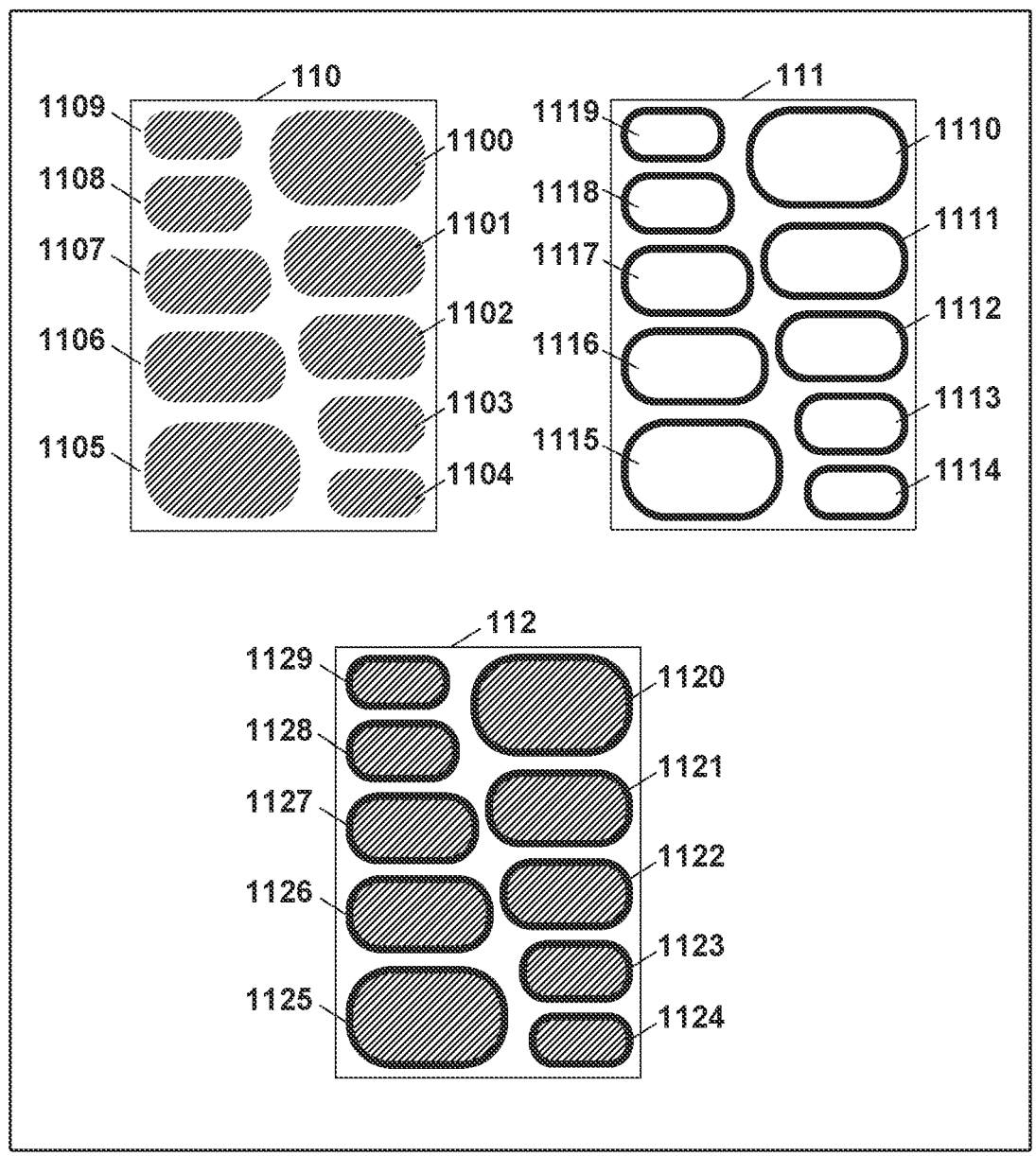
FIG. 11 is a view showing an example of an image of the cut print service and an example of an output image according to Example 1.

FIG. 11 is a view showing an example of an image of the cut print service and an example of an output image according to Example 1. Referring to FIG. 11, reference numeral 110 denotes a nail image generated in step S1004; and 111, a cut image generated in step S1004.

Nail images (hatched portions) in the nail image 110 are as follows. That is, the nail images include a right hand thumb nail image 1100, a right hand index finger nail image 1101, a right hand middle finger nail image 1102, a right hand ring finger nail image 1103, and a right hand little finger nail image 1104, and a left hand thumb nail image 1105, a left hand index finger nail image 1106, a left hand middle finger nail image 1107, a left hand ring finger nail image 1108, and a left hand little finger nail image 1109.

In addition, cut images (thick line portions) in the cut image 111 are as follows. That is, the cut images include a right hand thumb cut image 1110, a right hand index finger cut image 1111, a right hand middle finger cut image 1112, a right hand ring finger cut image 1113, and a right hand little finger cut image 1114, and a left hand thumb cut image 1115, a left hand index finger cut image 1116, a left hand middle finger cut image 1117, a left hand ring finger cut image 1118, and a left hand little finger cut image 1119.

In this example, the nail images and the cut images are formed by bitmap images. Each nail image is RGB data that is a general image data format. As the type of RGB data, standard color information such as sRGB or adobeRGB is preferably used. In this example, each color component holds 8-bit information within the range of 0 to 255. However, a different number of bits such as 16 bits may appropriately be used.

On the other hand, each cut image shows whether to cut or not, and is therefore a binary 1-bit image of "0" or "1". Alternatively, a method of forming a 32-bit image with four 8-bit channels including an α channel in addition of RGB channels may be employed. In this case, the cut strength can be designated in 256 levels of 0 to 255 by the 8-bit α channel, and a finer cut strength can be instructed to the printing apparatus 40.

When the above-described processing ends, the process advances to step S605 of FIG. 8.

Figure 12:
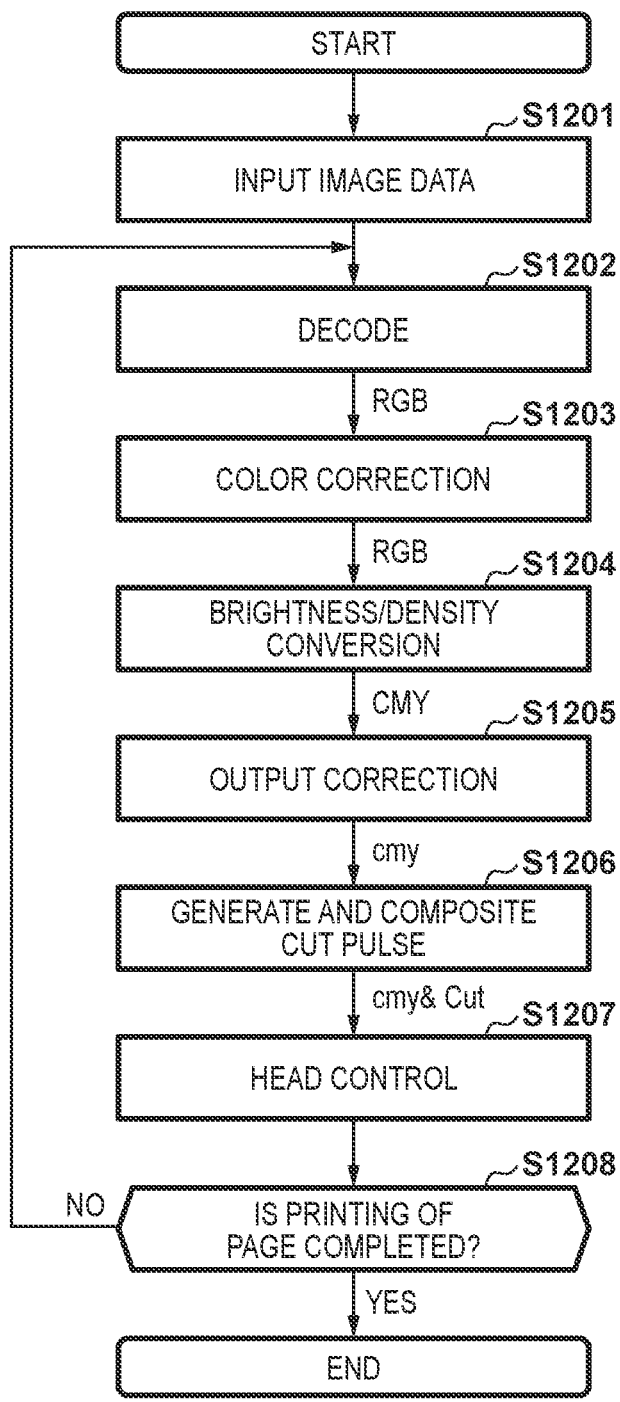
FIG. 12 is a flowchart showing image processing of generating heating pulses and driving the printhead according to Example 1.

FIG. 12 is a flowchart showing image processing of generating heating pulses and driving the printhead according to Example 1. This is a flowchart showing details of cut print job execution in step S615A of FIG. 8.

According to FIG. 12, in step S1201, image data in the cut print job received in step S814 is input. Next, in step S1202, decoding processing is executed if the image data is compressed or encoded. Furthermore, in step S1203, color correction processing is executed. This can also be executed on the side of the host PC 50. However, when performing color correction according to the characteristic of the printing apparatus 40, it is preferably performed by the printing apparatus 40. At this point of time as well, nail image data has the general RGB data format. At this point of time, however, the image data is generally RGB data reflecting the characteristic of the printing apparatus 40, that is, so-called device RGB. Note that in step S1203, no processing is particularly performed for the cut image.

Next, in step S1204, brightness/density conversion is executed. In a general thermal printer, when each color component of each pixel is expressed 8 bits, conversion is performed by $$C=255-R$$

$$M=255-G$$

$$Y=255-B$$

Here, in pulse control according to this example, for example, a magenta parameter for forming a single magenta (M) color and a magenta control parameter for suitably forming red (R) are different. Hence, to individually set these, brightness/density conversion using a three-dimensional lookup table (3D_LUT) is preferably executed. That is, conversion is performed by $$C=3D\_LUT[R][G][B][0]$$

$$M=3D\_LUT[R][G][B][1]$$

$$Y=3D\_LUT[R][G][B][2]$$

Here, the above-described 3D_LUT is formed by 256×256×256×3=50,331,648 data tables. Each data is data having the width of a pulse applied at each of the timings p0 to p8 in FIG. 7. However, to decrease the data amount, the number of grids may be decreased from 256 to 17. Using 17×17×17×3=14,739 data tables, a result may be calculated using an interpolation operation together. Not 17 grids but another suitable number of grids such as 16 grids, 9 grids, or 8 grids may appropriately be set, as a matter of course. As the interpolation method, any method such as known tetrahedral interpolation can be used.

Similarly, a yellow control parameter for forming red (R), cyan and yellow control parameters for forming green (G), magenta and cyan control parameters for forming blue (B), and yellow, magenta, and cyan control parameters for forming black (K) can also individually be set.

Furthermore, in step S1205, output correction is executed. First, pulse widths (c, m, y) for implementing the density components C, M, and Y are calculated using a one-dimensional lookup table (1D_LUT). That is, $$c=1D\_LUT[C]$$

$$m=1D\_LUT[M]$$

$$y=1D\_LUT[Y]$$

are calculated. Here, the maximum value of c is Δt3, the maximum value of m is Δt2, and the maximum value of y is Δt1. The printing apparatus 40 can modulate the color development strength on the infrared image member 10 by pulse width modulation (PWM). For this reason, if c, m, and y described above are smaller than the maximum values, the pulse widths can appropriately be made short, thereby implementing a desired tone. This processing may be done using a known means.

Also, here, the heating pulse by the printhead 30 is modulated depending on the temperature of the infrared image member 10 acquired by a temperature sensor (not shown) or the like. More specifically, control is performed such that the higher the acquired temperature is, the shorter the pulse width necessary for reaching the activation temperature is. This processing may be done using a known means. In addition, instead of directly detecting the temperature of the infrared image member 10 using a temperature sensor (not shown) or the like, the CPU 501 may execute temperature estimation for the infrared image member 10 and perform control based on the estimated temperature. As the temperature estimation method, any known method can be used.

Note that in step S1205 as well, no processing is particularly performed for the cut image.

Also, in step S1206, a cut pulse is generated and composited. More specifically, first, a cut pulse is generated based on a Cut value of each pixel in the cut image.

In this example, since the Cut value is a binary value of 0 or 1, the necessary pulse width is calculated by multiplying the pulse width Δt4 for cut by this. That is, $$p0=Cut \times \Delta t4$$

Next, the pulse width for forming the nail image and the cut pulse are composited. That is, the pulse widths at the timings p0 to p10 are defined as $$p0=y, p1=y, p2=m, p3=m, p4=m, p5=c, p6=c, p7=c, p8=c,\\ p9=Cut, \text{ and } p10=0,$$

and the pulses are composited.

Next, in step S1207, head control is executed. That is, the pulse widths at the timings p0 to p10 are controlled, thereby forming desired color development and cut processing on the infrared image member 10.

Next, in step S1208, it is checked whether printing of the page is completed. If the result is NO, the process returns to step S1202 to print the continuation of the page. If the result is YES, print processing is ended.

As described above, in the example of FIG. 9, of the 11 pulses at the timings p0 to p10, pulses used for color development of yellow (Y) are two pulses at p0 and p1.

Similarly, pulses for magenta (M) are three pulses at p2 to p4, and pulses for cyan (C) are four pulses at p5 to 8. The cut pulse is the pulse at p9.

Note that in the example shown in FIG. 9, the timing p10 is set as a relaxation time for heat dissipation associated with cut. This time should appropriately be set as needed, and may not be set if it is not particularly necessary. As a result, color development and cut can be implemented on a pixel basis on the infrared image member 10.

As described above, since cut and color development are performed on a pixel basis, deviation of a cut position and a color development position by one or more pixels does not occur in principle. That is, it is unnecessary to detect a paper deviation between printing and cut and perform correction, unlike the conventional technique, and very accurate cut can be implemented.

Referring back to FIG. 11, an output image 112 represents an image finally formed on the infrared image member 10 and cut positions. Hatched portions in the output image 112 indicate nail images, and thick line portions indicate cut positions.

Nail output images (thick line=cut position, and hatched portion=nail image) included in the output image 112 are as follows. That is, the output images include
a right hand thumb nail output image 1120, a right hand index finger nail output image 1121, a right hand middle finger nail output image 1122, a right hand ring finger nail output image 1123, and a right hand little finger nail output image 1124, and
a left hand thumb nail output image 1125, a left hand index finger nail output image 1126, a left hand middle finger nail output image 1127, a left hand ring finger nail output image 1128, and a left hand little finger nail output image 1129.

Each nail output image output in this state is already cut at the time of output. In addition, the images are cut in conformity with the shape of the nails of the user. Hence, when the peeling layer is peeled, and the seals are attached to the nails, nailing is completed.

In this example, since control is performed not to cause cut pixels to develop colors, white at the cut position is noticeable at the boundary to the nail image in some cases. As a method of reducing the white boundary generation, it is effective to print the cut pixels in the color of non-cut pixels adjacent to the cut pixels. This makes it possible to perform cut without making white of the cut pixels noticeable.

More specifically, a pixel portion on the periphery of each nail image in the nail image 110 shown in FIG. 11, which corresponds to the cut image 111, is preferably set to the same color as the nail image. The nail image formation is preferably executed in step S1003 of FIG. 10. This makes it possible to suppress noticeable white cut positions and form the nail images all the way up to the cut positions.

Also, when the image data is controlled to Bk (R=0, G=0, B=0) in the cut pixels, it is possible to assist cut performance, instead of making the cut pixels develop black.

Also, in this example, an example in which the Cut value is a binary value of "0" or "1" has been described. If the Cut value is expressed by 8 bits and set in 256 tones from 0 to 255, the cut pulse may be generated in the following way. That is, $p0 = Cut \times \Delta t4 / 255$ is calculated.

The longer the relaxation time is, the higher the cut performance is, but the longer the print time is. Hence, since cut is unnecessary in "print job execution" of step S616, it is preferable to set a high-speed print mode in which only pulse generation control at the timings p0 to p8 is performed. On the other hand, at the time of "cut print job execution" of step S615A, since the cut time and the relaxation time are needed, it is preferable to set a low-speed print mode in which pulse generation control at the timings p0 to p9 or from the timing p10 is executed. This can prevent the print speed from lowering when executing a print job that does not need cut.

More specifically, high/low of the print speed is suitably set by controlling the conveyance speed of the infrared image member 10.

Hence, according to the above-described example, a dedicated cutter or alignment mechanism is not required, and accurate and precise cut can be performed on a pixel basis using resistors (heaters) used for color development. Note that in this example, nail seal creation has been described as an example. However, the present invention is not limited to this, and can be applied to any purpose if the above-described effect can be achieved. For example, a seal such as a name seal to be attached to stationery may be created. The adhesive layer may be configured to stick to the peeling side, and a sheet that is not a seal but can be cut in an arbitrary shape may be created.

In addition, the infrared image member 10 may be not provided with the adhesive layer 19 or the peeling layer 20 described with reference to FIG. 4 (in this case, the base material 12 is the lowermost layer). At this time, to avoid the above-described discharge failure, cutting in a broken line, a dotted line, or an alternate long and short dashed line (partial cut) is preferably executed such that the infrared image member 10 is not completely separated in the cut region. This makes it possible to stably discharge the infrared image member 10, and the cut region can easily be separated by applying a force to the infrared image member 10 after the discharge.

Example 2

In Example 1, the print speed at the time of execution of a "cut print job" is lower than that at the time of execution of a normal "print job". In Example 2, an example in which the lowering of the print speed is reduced will be described. More specifically, a cut pulse and image formation pulses are superimposed, thereby improving the print speed of the cut print job. The configuration will be described below.

Figure 13:
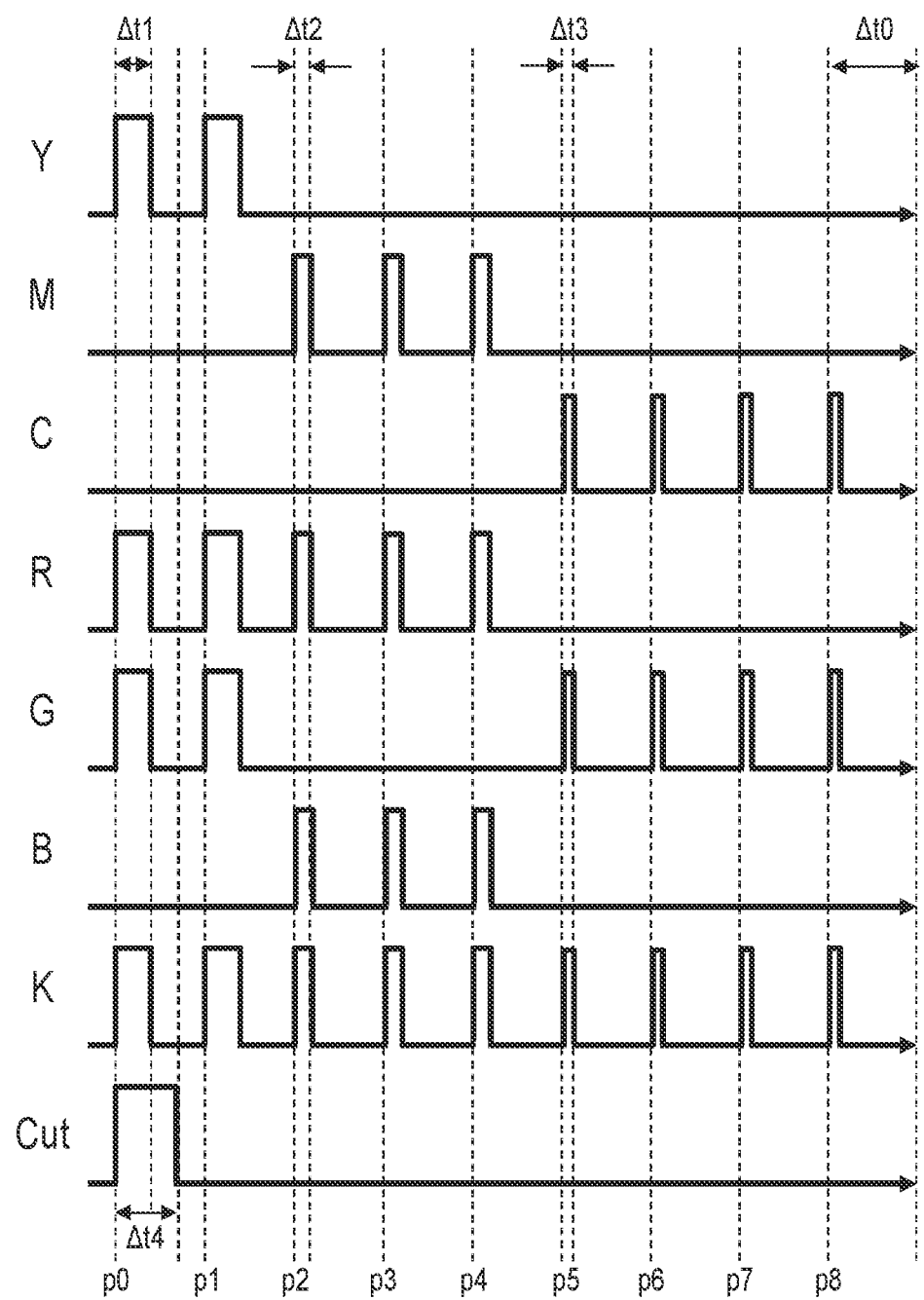
FIG. 13 is a view showing heating pulses according to Example 2.

FIG. 13 is a view showing heating pulses according to Example 2.

To implement heating pulses as shown in FIG. 13, cut pulse generation/composition processing of step S1206 shown in FIG. 12 is executed as follows. That is, the pulse width of a cut pulse Cut at timing p0 is calculated by $p0 = Cut \times \Delta t4$ That is, in this example as well, since the Cut value is a binary value of "0" or "1", the necessary pulse width is calculated by multiplying the pulse width $\Delta t4$ for cut by this.

Next, the pulse width for forming a nail image and the cut pulse are composited. That is, the pulses are composited by defining p0=max (y, Cut), p1=y, p2=m, p3=m, p4=m, p5=c, p6=c, p7=c, and p8=c.

Note that if the above composition is implemented by an electric circuit, this may be implemented in a form of p0=y or Cut. When the pixel values of a nail image in the cut pixels are set to (R=255, G=255, B=255), timings p1 to p8 can be set to 0. In this way, the necessity of pulse generation control at timings p9 and p10 in FIG. 9 can be obviated, and printing and cut can be performed in the same time as the conventional example shown in FIG. 7.

Figure 14:
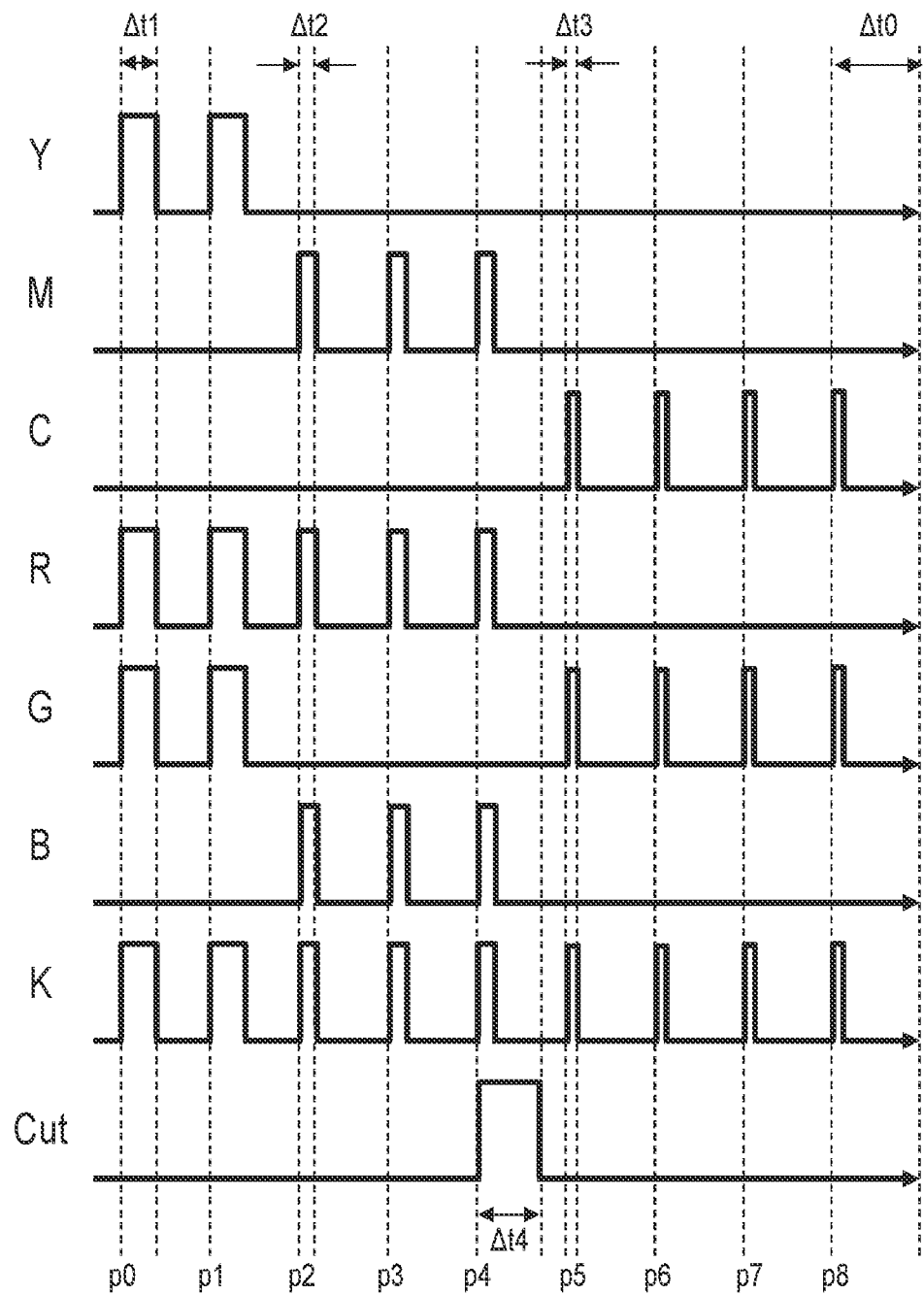
FIG. 14 is a view showing another example of heating pulses according to Example 2.

FIG. 14 is a view showing another example of heating pulses according to Example 2.

This is an example in which a cut pulse and image formation pulses are superimposed to improve the print speed of the cut print job, as in pulse generation control shown in FIG. 13, and occurrence of undesired color development in the cut pixels is reduced.

In this example, the pulse width for forming a nail image and the cut pulse are composited in the following way. That is, the pulses are composited by defining p0=y, p1=y, p2=m, p3=m, p4=max (m, Cut), p5=c, p6=c, p7=c, and p8=c.

Note that if the above composition is implemented by an electric circuit, this may be implemented in a form of p4=m or Cut.

In the example shown in FIG. 13, since the cut pulse is generated at the timing p0, the color development layer of Y may develop the color because of the thermal effect of the image formation heating pulses of adjacent pixels. On the other hand, in the example shown in FIG. 14, the cut pulse is generated at p4 just at the midpoint of the timings p0 to p8, thereby reducing the influence of the image formation heating pulses of the adjacent pixels and also reducing the influence of the cut pulse on the adjacent pixels. In fact, the optimum position in the timings p1 to p8 is decided based on the ratio of the heating amounts of the cut pulse and the image formation pulses.

Hence, according to the above-described example, the application position of the cut pulse is superimposed on the application positions of the image formation pulses, thereby executing the cut print job without lowering the print speed.

Example 3

In Examples 1 and 2, cut printing is basically executed under such a condition that a cut pulse does not develop colors of an image. That is, the relative relationship of heating times is given by heating time of Cut<heating time of Y<heating time of M<heating time of C Peak Temperatures by Heating Hold peak temperature of Cut>peak temperature of Y>peak temperature of M>peak temperature of C Here, in particular, when control is performed such that peak temperature of Cut>melting point of infrared image member 10>peak temperature of Y holds, the infrared image member 10 can be cut without causing any of the color development layers of Y, M, and C to develop colors.

Here, an example in which outside the range of the above condition, the influence of color development of an image is reduced in the infrared image member 10 in which a cut pulse develops colors of an image will be described.

Figure 15:
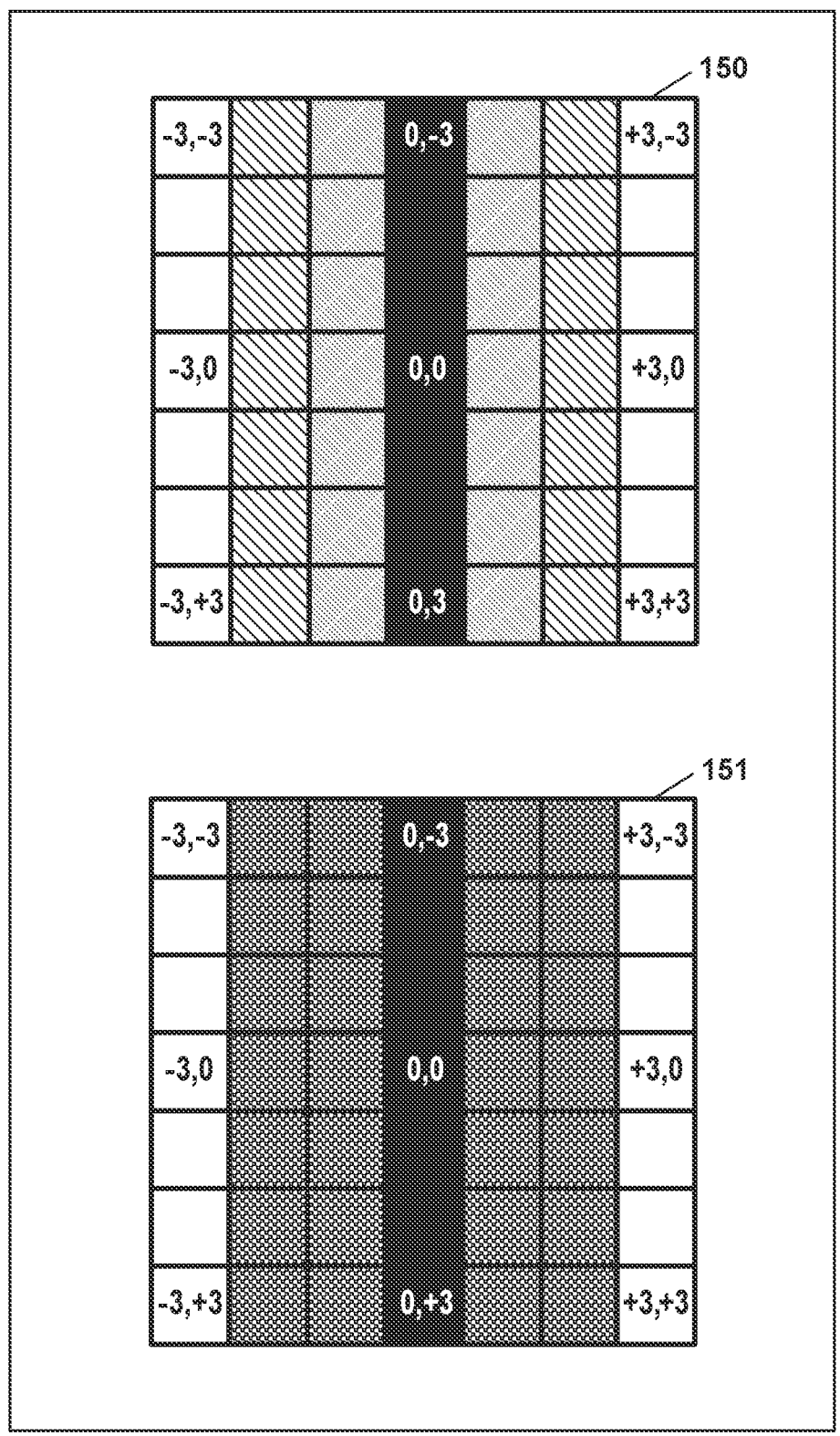
FIG. 15 is a view showing an example of an image of a cut print service according to Example 3.

FIG. 15 is a view showing an example of an image of a cut print service according to Example 3.

In this example, an example in which the relative relationship of heating times is given by heating time of Y<heating time of M<heating time of C<heating time of Cut will be described.

This means that when energy for enabling cut is supplied, the color development layers of Y, M, and C develop colors because of the infrared image member 10 having a sufficient high melting point or sufficient thickness. Not only cut pixels but also peripheral pixels develop colors if the heating energy for cut is large, and the user readily recognizes "color development by cut".

Referring to FIG. 15, an image 150 shows the color development state of the cut printing result of 7×7 pixel with respect to the center pixel (pixel position (0, 0)) as the center. Each pixel position is indicated by a relative pixel position in the horizontal direction and a relative pixel position in the vertical direction viewed from the center pixel. Relative coordinates are represented by defining the right and lower sides as "+" and the left and upper sides as "−". For example, in the image 150, the position of the pixel at the upper left end is expressed as (−3, −3), and the position of the pixel on the right side of the center pixel is expressed as (+1, 0).

The pixels of the vertical line (seven pixels at pixel positions (0, −3) to (0, +3)) portion at the center show the cut position, and cut heating is performed for the seven pixels. As a result, first, the seven pixels at the cut position develop black, and then, the infrared image member 10 is cut. That is, this is the portion of black pixels in the image 150.

In addition, pixels adjacent to the cut position (seven pixels at pixel positions (−1, −3) to (−1, +3) and seven pixels at pixel positions (+1, −3) to (+1, +3)) develop darker colors due to diffusion of cut heat. That is, this is the portion of pixels of dark hatching in the image 150.

Pixels located at a distance of two pixels viewed from the cut position (seven pixels at pixel positions (−2, −3) to (−2, +3) and seven pixels at pixel positions (+2, −3) to (+2, +3)) develop lighter colors due to further thermal diffusion of cut heat from the adjacent pixels. That is, this is the portion of pixels of light hatching in the image 150.

Pixels located at a distance of three pixels viewed from the cut position (seven pixels at pixel positions (−3, −3) to (−3, +3) and seven pixels at pixel positions (+3, −3) to (+3, +3)) do not develop colors, or even if they do, colors can hardly visually be recognized because diffusion of cut heat is sufficiently small. That is, this is the portion of hollow white pixels in the image 150.

In this example, to make it difficult for the user to recognize the color development of the dark hatching portion and the light hatching portion of the image 150 as "color development by cut", the pixels that develop colors in cut heating are changed to black (pixel value R=0, G=0, B=0).

Referring to FIG. 15, an image 151 represents an image in which the pixels that develop colors in cut heating are changed to black (pixel value R=0, G=0, B=0).

In the image 151, the pixels of the vertical line (seven pixels at pixel positions (0, −3) to (0, +3)) portion at the center show the cut position, and concerning the seven pixels, the pixels are changed to black (pixel value C=255, M=255, and Y=255). That is, this is the portion of black pixels in the image 151.

Also, concerning the pixels adjacent to the cut position (seven pixels at pixel positions (−1, −3) to (−1, +3) and seven pixels at pixel positions (+1, −3) to (+1, +3)) as well, the pixels are changed to black (pixel value C=255, M=255, and Y=255). That is, this is the portion of hatching pixels in the image 151. Furthermore, concerning pixels located at a distance of two pixels viewed from the cut position (seven pixels at pixel positions (−2, −3) to (−2, +3) and seven pixels at pixel positions (+2, −3) to (+2, +3)) as well, the pixels are changed to black (pixel value C=255, M=255, and Y=255). That is, this is the portion of hatching pixels in the image 151.

For the pixels located at a distance of three pixels viewed from the cut position (seven pixels at pixel positions (−3, −3) to (−3, +3) and seven pixels at pixel positions (+3, −3) to (+3, +3)), the values of the pixels are not particularly changed. That is, this is the portion of hollow white pixels in the image 151.

When the above-described image processing is performed, color development of the dark hatching portion and the light hatching portion of the image 150, which are formed by cut, is replaced with black so that it is not visually recognized as "unnecessary color development caused by cut".

Next, a case in which the above-described image processing is executed as actual processing between steps S1204 and S1205 in FIG. 12 will be described as an example.

First, the image data of the image 150 is input while setting the pixel value of the C component=C[x][y], the pixel value of the M component=M[x][y], the pixel value of the Y component=Y[x][y], and Cut information=Cut[x][y].

Next, it is checked whether a Cut pixel exists in two peripheral pixels of a pixel of interest. Here, if a Cut pixel exists, its pixel value is changed to black (in this example, C[x][y]=255, M[x][y]=255, Y[x][y]=255). More specifically, processing is performed as follows. That is, processing is executed by

```
If((Cut[x−2][y]   ==1) or
   (Cut[x−1][y−1]==1) or
   (Cut[x][y−2]              ==1) or
   (Cut[x+1][y−1]            ==1) or
   (Cut[x+2][y]              ==1) or
   (Cut[x+1][y+1]            ==1) or
   (Cut[x][y+2]              ==1) or
   (Cut[x−1][y+1]            ==1) or
   (Cut[x−1][y]              ==1) or
   (Cut[x][y−1]              ==1) or
   (Cut[x+1][y]              ==1) or
   (Cut[x][y+1]              == 1) or
   (Cut[x][y]                ==1)){
      C[x][y] =              255;
      M[x][y] =              255;
      Y[x][y] =              255;   }
```

This processing is executed for all pixels, thereby setting a pixel for which (the absolute value of the position difference of the x-coordinate+the absolute value of the position difference of the y-coordinate) is 2 or less to black.

In this example, a target pixel is changed to black. However, the present invention is not limited to this. The degree of color development of an adjacent pixel depends on the material of the infrared image member 10 or control of the printing apparatus 40. Hence, for example, if color development occurs in the M layer and the C layer to form blue to cyan, blue may be used in place of black for color development of the M layer and the C layer. Similarly, if only the C layer develops color, cyan may be used in place of black/blue.

FIG. 16 is a view showing another example of the image of the cut print service according to Example 3.

In the above-described example, an example in which the periphery of cut pixels is changed to black to make color development caused by cut unnoticeable has been described. When the periphery of cut is changed to black pixels, a restriction that unique color (for example, black) is always developed with respect to the color of a printed image occurs.

Hence, an example in which a color development amount is canceled by subtracting the color development amount from the original image will be described here. Note that color development itself, which is caused by cut, is the same as in the image 150.

An image 160 shown in FIG. 16 shows an example in which the magenta (M) color, the cyan (C) color, and the yellow (Y) color of pixels that develop colors in cut heating are modulated.

First, the pixels of the vertical line (seven pixels at pixel positions (0, −3) to (0, +3)) portion at the center show the cut position, and the pixel values of the seven pixels are decreased in all color components (CMY). This is the portion of pixels indicated by "−CMY" in the image 160.

In addition, for pixels adjacent to the cut position (seven pixels at pixel positions (−1, −3) to (−1, +3) and seven pixels at pixel positions (+1, −3) to (+1, +3)), the pixel values are decreased in two color components (CM). This is the portion of pixels indicated by "−CM" in the image 160. For pixels located at a distance of two pixels viewed from the cut position (seven pixels at pixel positions (−2, −3) to (−2, +3) and seven pixels at pixel positions (+2, −3) to (+2, +3)), the pixel values are decreased in one color component (C). This is the portion of pixels indicated by "−C" in the image 160. For pixels located at a distance of three pixels viewed from the cut position (seven pixels at pixel positions (−3, −3) to (−3, +3) and seven pixels at pixel positions (+3, −3) to (+3, +3)), the pixel values are not particularly changed. This is the portion of hollow white pixels in the image 160.

When the above-described image processing is executed, the color development amount caused by cut of the image 160 is canceled by the decrease amount of the pixel values (decrease amount≈color development by cut). This makes it difficult for the user to visually recognize color development caused by cut.

More specifically, the following processing is executed. That is, the data of the image 160 is input while setting the pixel value of the C component=C[x][y], the pixel value of the M component=M[x][y], the pixel value of the Y component=Y[x][y], and Cut information=Cut[x][y].

Next, it is checked whether a Cut pixel exists in two peripheral pixels of a pixel of interest. If it is determined that a Cut pixel exists, the pixel value is decreased (in this example, C[x][y]=0, M[x][y]=0, Y[x][y]=0).

More specifically, the following processing is executed. That is, processing is executed by

```
If((Cut[x−2][y]==1) or
   (Cut[x−1][y−1]==1) or
   (Cut[x][y−2]              ==1) or
   (Cut[x+1][y−1]            ==1) or
   (Cut[x+2][y]              ==1) or
   (Cut[x+1][y+1]==1) or
   (Cut[x][y+2]              ==1) or
   (Cut[x−1][y+1]            ==1)    {
      C[x][y]=0;}
If((Cut[x−1][y] ==1) or
   (Cut[x][y−1]              ==1) or
   (Cut[x+1][y]              ==1) or
   (Cut[x][y+1]              ==1)    {
      C[x][y]=0;
      M[x][y]=0; }
```

```
        (Cut[x][y]    ==1)) {
            C[x][y]=0;
            M[x][y]=0;
            Y[x][y]=0;    }
```

This processing is executed for all pixels, thereby setting a pixel for which (the absolute value of the position difference of the x-coordinate+the absolute value of the position difference of the y-coordinate) is 2: C=0
a pixel for which (the absolute value of the position difference of the x-coordinate+the absolute value of the position difference of the y-coordinate) is 1: C=0, M=0
a pixel for which (the absolute value of the position difference of the x-coordinate+the absolute value of the position difference of the y-coordinate) is 0: C=0, M=0, Y=0

In the above-described example, the decrease of the pixel value of each color component is always set to "0". However, since the degree of color development of an adjacent pixel depends on the material of the infrared image member or control of the printing apparatus, the decrease amount is preferably appropriately set in accordance with the color development amount.

Also, in the above-described embodiment, a form in which the printing apparatus and the host apparatus are separated has been described. However, the host apparatus serving as a supply source for supplying image data can be an image capturing device such as a digital camera. In this case, an apparatus that integrates a printing apparatus and a digital camera, that is, a so-called printing apparatus with an image capturing function is also incorporated in the present invention.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A printing apparatus configured to heat a sheet-shaped print medium in which a plurality of color development layers that develop colors in accordance with heating are stacked in correspondence with a plurality of colors so as to form an image on the print medium by causing a desired color development layer in the plurality of color development layers to independently develop the color, the apparatus comprising:
   a printhead including a plurality of heating elements;
   an input unit configured to receive, from a host apparatus,
      a print job including print data and information for instructing to cut the print medium of a printed image or not to cut;
   a first generation unit configured to, when the print job received by the input unit instructs to cut the print medium of the printed image, generate, from the print data, image data for forming an image on the print medium and cut information for specifying a position to cut the image from the print medium;
   a second generating unit configured to generate a first pulse for driving the plurality of heating elements of the printhead based on the image data generated by the first generation unit, and generate a second pulse for driving the plurality of heating elements of the printhead based on the cut information generated by the first generation unit; and
   a drive unit configured to drive the plurality of heating elements by the first pulse generated by the second generating unit to form an image on the print medium, and drive the plurality of heating elements by the second pulse generated by the second generating unit to apply heat beyond a melting point of the print medium to melt the print medium so as to cut the print medium on which the image is formed.

2. The printing apparatus according to claim 1, wherein in the print medium, a first color development layer configured to develop yellow (Y), a second color development layer configured to develop magenta (M), a third color development layer configured to develop cyan (C), and a base material are formed sequentially from a side where the plurality of heating elements of the printhead contact, and
   a pulse width of the first pulse is longest for the first color development layer and becomes short in an order of the second color development layer and the third color development layer.

3. The printing apparatus according to claim 2, wherein an adhesive layer is provided on a lower side of the base material,
   a peeling layer is further provided on a lower side, and
   the print medium is molten up to the base material by driving the plurality of heating elements of the printhead by the second pulse.

4. The printing apparatus according to claim 2, wherein the base material is a lowermost layer of the print medium, and
   the drive unit partially cuts the print medium up to the base material by driving the plurality of heating elements of the printhead by the second pulse.

5. The printing apparatus according to claim 1, wherein a pulse width of the second pulse is longer than a pulse width of the first pulse.

6. The printing apparatus according to claim 1, wherein the drive unit drives the plurality of heating elements of the printhead by the first pulse and then drives the plurality of heating elements of the printhead by the second pulse.

7. The printing apparatus according to claim 1, wherein the drive unit generates a pulse in which the first pulse and the second pulse are superimposed.

8. The printing apparatus according to claim 1, wherein the drive unit modulates the first pulse used to form an image in a region adjacent to a region where the print medium is to be cut by the second pulse.

9. The printing apparatus according to claim 8, wherein a pixel included in the adjacent region is changed to a black pixel by the modulation.

10. The printing apparatus according to claim 8, wherein in the modulation, a density of color development of a pixel included in the adjacent region is decreased by a color development amount caused by heating to the region where the print medium is to be cut by the second pulse.

11. The printing apparatus according to claim 1, wherein the host apparatus is included in the printing apparatus.

12. A print control method of a printing apparatus configured to heat, by a printhead including a plurality of heating elements, a sheet-shaped print medium in which a plurality of color development layers that develop colors in accordance with heating are stacked in correspondence with a plurality of colors so as to form an image on the print medium by causing a desired color development layer of the plurality of color development layers to independently develop the color, the method comprising:
  receiving, from a host apparatus, a print job including print data and information for instructing to cut the print medium of a printed image or not to cut;
  when the print job input in the inputting instructs to cut the print medium of the printed image, generating, from the print data, image data for forming an image on the print medium and cut information for specifying a position to cut the image from the print medium;
  generating a first pulse for driving the plurality of heating elements of the printhead based on the image data generated in the generating the image data and the cut information, and generating a second pulse for driving the plurality of heating elements of the printhead based on the cut information generated in the generating the image data and the cut information; and
  driving the plurality of heating elements by the first pulse generated in the generating the first pulse and the second pulse to form an image on the print medium, and driving the plurality of heating elements by the second pulse generated in the generating the first pulse and the second pulse to apply heat beyond a melting point of the print medium to melt the print medium so as to cut the print medium on which the image is formed.

* * * * *